US010659805B2

(12) United States Patent
Franche et al.

(10) Patent No.: US 10,659,805 B2
(45) Date of Patent: May 19, 2020

(54) METHOD AND APPARATUS FOR VIDEO INTERMODAL TRANSCODING

(71) Applicant: ECOLE DE TECHNOLOGIE SUPERIEURE, Montreal (CA)

(72) Inventors: Jean-François Franche, Montreal (CA); Stéphane Coulombe, Brossard (CA)

(73) Assignee: ECOLE DE TECHNOLOGIE SUPERIEURE, Montreal (CA)

(*) Notice: Subject to any disclaimer, the term of this patent is extended or adjusted under 35 U.S.C. 154(b) by 178 days.

(21) Appl. No.: 15/010,428

(22) Filed: Jan. 29, 2016

(65) Prior Publication Data

US 2016/0227241 A1   Aug. 4, 2016

Related U.S. Application Data

(60) Provisional application No. 62/109,120, filed on Jan. 29, 2015.

(51) Int. Cl.
*H04N 19/52* (2014.01)
*H04N 19/103* (2014.01)
(Continued)

(52) U.S. Cl.
CPC .......... *H04N 19/52* (2014.11); *H04N 19/103* (2014.11); *H04N 19/167* (2014.11);
(Continued)

(58) Field of Classification Search
CPC ...... H04N 19/176; H04N 19/40; H04N 19/70; H04N 21/234309; H04N 19/139;
(Continued)

(56) References Cited

U.S. PATENT DOCUMENTS 6,823,013 B1 * 11/2004 Boice .............. H04N 19/43
375/240.17
6,983,018 B1   1/2006 Lin
(Continued)

FOREIGN PATENT DOCUMENTS

CA         2885501         9/2015

OTHER PUBLICATIONS

Chen, Z. Y., Fang, J. T., Liao, T. L., & Chang, P. C., Efficient PU Mode Decision and Motion Estimation for H.264/AVC to HEVC Transcoder, Signal & Image Processing: An International Journal (SIPIJ), Apr. 2014, pp. 81-93, vol. 5, No. 2.
(Continued)

*Primary Examiner* — Tsion B Owens
*Assistant Examiner* — Daniel Chang
(74) *Attorney, Agent, or Firm* — IP-Mex Inc.; Victoria Donnelly

(57) ABSTRACT

A video intermodal transcoder converts a compressed bitstream formulated according a type-1 compression scheme to a type-2 compressed bitstream formulated according to a type-2 compression scheme. The transcoder includes an augmented type-1 decoder, a transcoder kernel, and an augmented type-2 encoder. The transcoder kernel performs processes of creating motion-vector candidates and pre-computing prediction errors for each cell of a predefined image coding block and for each candidate motion vector for repetitive use in evaluating various image partitions. In an implementation where the type-1 compression scheme follows the H.264 standard and the type-2 compression scheme follows the HEVC standard, the transcoder exploits the flexibility of the coding-tree structure and other HEVC features to significantly reduce the bit rate of the compressed bit stream. The pre-computation of prediction errors signifi-
(Continued)

cantly reduces the processing effort, hence increases the throughput of the transcoder.

20 Claims, 30 Drawing Sheets

(51) Int. Cl.
    *H04N 19/167*     (2014.01)
    *H04N 19/176*     (2014.01)
    *H04N 19/70*     (2014.01)
    *H04N 19/65*     (2014.01)
    *H04N 19/44*     (2014.01)
    *H04N 19/40*     (2014.01)

(52) U.S. Cl.
    CPC ........... *H04N 19/176* (2014.11); *H04N 19/40* (2014.11); *H04N 19/44* (2014.11); *H04N 19/65* (2014.11); *H04N 19/70* (2014.11)

(58) Field of Classification Search
    CPC .... H04N 19/122; H04N 19/197; H04N 19/43; H04L 65/607
    USPC ............ 375/240.02, 240.03, 240.15, 240.16, 375/240.17, 240.18, 240.25; 706/17
    See application file for complete search history.

(56) References Cited

U.S. PATENT DOCUMENTS

| | | | |
|---|---|---|---|
| 2006/0198445 A1* | 9/2006 | Li | H04N 19/56 375/240.17 |
| 2007/0286286 A1 | 12/2007 | Heng | |
| 2008/0126278 A1* | 5/2008 | Bronstein | H04N 19/176 706/17 |
| 2009/0097560 A1* | 4/2009 | Robertson | H04N 19/176 375/240.16 |
| 2009/0225845 A1* | 9/2009 | Veremeev | H04N 5/145 375/240.16 |
| 2009/0323813 A1* | 12/2009 | Maciel de Faria | H04N 19/56 375/240.16 |
| 2010/0166073 A1* | 7/2010 | Schmit | H04N 19/176 375/240.16 |
| 2011/0170597 A1* | 7/2011 | Shi | H04N 19/176 375/240.16 |
| 2011/0200112 A1 | 8/2011 | Won | |
| 2013/0121401 A1 | 5/2013 | Zheludkov | |
| 2013/0208799 A1* | 8/2013 | Srinivasamurthy | H04N 19/119 375/240.16 |
| 2013/0343459 A1* | 12/2013 | Bici | H04N 19/105 375/240.16 |
| 2014/0028908 A1* | 1/2014 | Zhou | H04N 7/014 348/441 |
| 2014/0185688 A1* | 7/2014 | Kimura | H04N 19/197 375/240.18 |
| 2015/0092837 A1* | 4/2015 | Chen | H04N 19/597 375/240.02 |

OTHER PUBLICATIONS

Zhang, D., Li, B., Xu, J., &Li, H.,Fast Transcoding from H.264 AVC to High Efficiency Video Coding, 2012 IEEE International Conference on Multimedia and Expo, Jul. 2012, pp. 651-656.
Peixoto, E., & Izquierdo, E., A complexity-scalable transcoder from H. 264/AVC to the new HEVC codec, 2012 IEEE International Conference on Image Processing (ICIP), Sep. 2012, pp. 737-740, IEEE.
Shen, T., Lu, Y., Wen, Z., Zou, L., Chen, Y., & Wen, J., Ultra fast H. 264/AVC to HEVC transcoder, 2013 Data Compression Conference (DCC), Mar. 2013, pp. 241-250, IEEE.
Peixoto, E., Shanableh, T., & Izquierdo, E., (2014). H. 264/AVC to HEVC Video Transcoder Based on Dynamic Thresholding and Content Modeling, IEEE Transactions on Circuits and Systems for Video Technology, Jan. 2014, pp. 99-112, vol. 24, No. 1.
Jiang, W., & Chen, Y. W. (2013). Low-Complexity Transcoding From H.264 to HEVC Based on Motion Vector Clustering, Electronics Letters, Sep. 12, 2013, pp. 1224-1226, vol. 49, No. 19.
Xing, P., Tian, Y., Zhang, X., Wang, Y., & Huang, T., A Coding Unit Classification Based AVC-to-HEVC Transcoding With Background Modeling for Surveillance Videos, Visual Communications and Image Processing (VCIP), Nov. 2013, pp. 1-6, IEEE.
Peixoto, E., Macchiavello, B., Hung, E. M., Zaghetto, A., Shanableh, T., & Izquierdo, E., An H. 264/AVC to HEVC video transcoder based on mode mapping, 2013 IEEE International Conference on Image Processing (ICIP), Sep. 2013, pp. 1972-1976, IEEE.
Luo, R., Xie, R., & Zhang, L., Fast AVS to HEVC Transcoding Based on Roi Detection Using Visual Characteristics, Broadband Multimedia Systems and Broadcasting (BMSB), 2014 IEEE International Symposium on, Jun. 2014, pp. 1-6, IEEE.
Jiang, W., Chen, Y., & Tian, X., Fast Transcoding From H.264 to HEVC Based on Region Feature Analysis, Multimedia Tools and Applications, Dec. 2014, pp. 2179-2200, vol. 73, No. 3.
Fang, J. T., Chen, Z. Y., Liao, T. L. & Chang, P. C., A fast PU Mode Decision Algorithm for H.264/AVC to HEVC transcoding, Fourth International conference on Computer Science & Information Technology (CCSIT), Feb. 2014, pp. 215-225 , vol. 4, No. 2.
Chen, Z. Y., Tseng, C. T., & Chang, P. C., Fast inter prediction for H. 264 to HEVC Transcoding, 3rd International Conference on Multimedia Technology (ICMT), Nov. 2013, pp. 1301-1308, Guangzhou, China.
Peixoto, E., Macchiavello, B., Hung, E. M., & De Queiroz, R. L., A fast HEVC Transcoder Based on Content Modeling and Early Termination, 2014 IEEE International Conference on Image Processing (ICIP), Oct. 2014, pp. 2532-2536, IEEE.
Peixoto, E., Macchiavello, B., De Queiroz, R. L., & Hung, E M., Fast H.264/AVC to HEVC Transcoding Based on Machine Learning, 2014 International Telecommunications Symposium (ITS), Aug. 2014, pp. 1-4, IEEE.
Kang, D., Kang, Y., Lee, E., & Hong, Y. (2014). Bottom-Up Pruning Algorithm for Intra-Prediction in High-Efficiency Video Coding, Electronics Letters, Sep. 2014, pp. 1345-1347, vol. 50, No. 19, IET.
Blasi, S. G., Zupancic, I., Izquierdo, E., & Peixoto, E., Fast HEVC Coding Using Reverse CU Visiting, Picture Coding Symposium (PCS), May 2015, pp. 50-54, IEEE.
Huang, H., Zhao, Y., Lin, C., & Bai, H., Fast Bottom-Up Pruning for HEVC Intraframe Coding, Visual Communications and Image Processing (VCIP), Nov. 2013, pp. 1-5, IEEE.
Zupancic, I., Blasi, S. G., & Izquierdo, E., Inter-prediction Optimisations for Fast HEVC Encoding of Ultra High Definition Content, 2015 International Conference on Systems, Signals and Image Processing (IWSSIP), Sep. 2015, pp. 85-88, IEEE.
Ohm, J. R., Sullivan, G. J., Schwarz, H., Tan, T. K., & Wiegand, T., Comparison of the Coding Efficiency of Video Coding Standards—Including High Efficiency Video Coding (HEVC), IEEE Transactions on Circuits and Systems for Video Technology, Oct. 2012, pp. 1669-1684, vol. 22, No. 12.
Vetro, A., Christopoulos, C., & Sun, H., Video Transcoding Architectures and Techniques: An Overview, IEEE Signal Processing Magazine, Mar. 2003, pp. 18-29, vol. 20, No. 2, IEEE.
Sullivan, G. J., Ohm, J. R., Han, W. J., & Wiegand, T., Overview of the High Efficiency Video Coding (HEVC) Standard, IEEE Transactions on Circuits and Systems for Video Technology, Dec. 2012, pp. 1649-1668, vol. 2, No. 12.
Bjóntegaard, G., Document VCEG-M33: Calculation of Average PSNR Differences Between RD-Curves, ITU-T VCEG Meeting, Apr. 2001, Austin, Texas, USA, Tech. Rep.
Diaz-Honrubia, A. J., Martinez, J. L., Puerta, J. M., Gámez, J. A., De Cock, J., & Cuenca, P., Fast Quadtree Level Decision Algorithm for H.264/HEVC Transcoder, 2014 IEEE International Conference on Image Processing (ICIP), Oct. 2014, pp. 2497-2501, IEEE.
Diaz-Honrubia, A., Martinez, J., Cuenca, P., Gamez, J., & Puerta, J., Adaptive Fast Quadtree Level Decision Algorithm for H. 264/

(56) References Cited

OTHER PUBLICATIONS

HEVC Video Transcoding, IEEE Transactions on Circuits and Systems for Video Technology, Jan. 2016, pp. 154-168, vol. 26. No. 1.

Zheng, F., Shi, Z., Zhang, X., & Gao, Z., Effective H. 264/AVC to HEVC Transcoder Based on Prediction Homogeneity, 2014 IEEE Visual Communications and Image Processing Conference, Dec. 2014, pp. 233-236, IEEE.

Nagaraghatta, A., Zhao, Y., Maxwell, G., & Kannangara, S., Fast H. 264/AVC to HEVC Transcoding Using Mode Merging and Mode Mapping, 2015 IEEE 5th International Conference on Consumer Electronics—Berlin (ICCE—Berlin), Sep. 2015, pp. 165-169, IEEE.

Chen, Y., Wen, Z., Wen, J., Tang, M., & Tao, P., Efficient Software H. 264/AVC to HEVC Transcoding on Distributed Multicore Processors, IEEE Transactions on Circuits and Systems for Video Technology, Dec. 2014, pp. 1423-1434, vol. 25, No. 8.

A. Huangyuan, L. Song, Y. Ma, R. Xie and Z. Luo, Learning Based Fast H.264 to H.265 Transcoding, 2015 Asia-Pacific Signal and Information Processing Association Annual Summit and Conference (APSIPA), Dec. 2015, pp. 563-570, Hong Kong.

\* cited by examiner

Examples: Macroblock partitioning patterns

METHOD AND APPARATUS FOR VIDEO INTERMODAL TRANSCODING

CROSS-REFERENCE TO RELATED APPLICATIONS

This application claims priority to provisional application 62/109,120, filed on Jan. 29, 2015, the content of which is incorporated herein by reference in its entirety.

FIELD OF THE INVENTION

The present invention relates to video signal encoding and transcoding. In particular, the invention is directed to methods and apparatus for realizing efficient video intermodal transcoding.

BACKGROUND

In transforming an analogue signal into a digital signal, the analogue signal is sampled at an adequate sampling rate. The magnitude of each sample, or the value of a predefined function of each sample, is approximated by one of a number of discrete levels, often referenced as quantization levels. The larger the number of quantization levels, or equivalently the smaller a quantization step, the more accurate the digital representation. A video signal transformed into digital format is further organized into a succession of sets of samples, where each set of samples, often called a frame, may be displayed as an image using a display device. Each image is defined by a number of "picture elements" (pixels), often called display resolution.

Naturally the higher the pixels' spatial density, the closer the image to the original picture it represents. A displayed image persists until replaced by a succeeding image. Thus, the higher the rate of changes of displayed images, the higher the image rate, also called frame rate. Each video frame is compressed by exploiting spatiotemporal redundancies. In the encoding process, spatiotemporal predictions are performed to reduce redundancies and differences from these predictions (also called residual information) are transformed (often using a discrete cosine transform or a similar transform), quantized, entropy coded, and transmitted. As in the quantization of analogue signals, the quantization of transformed residual information affects the fidelity (visual quality) as well as the bit rate of the encoded signal. A smaller quantization step leads to a better signal fidelity and to a higher bit rate. The three above parameters (display resolution, frame rate and quantization (or quantization step)) affect the flow rate (bit rate) or file size, as well as the fidelity, of a video sequence. The higher the display resolution, the higher the flow rate (or size) and fidelity. The lower the quantization step, the higher the flow rate (or size) and fidelity. There are several methods of encoding video signals which aim at reducing the size of an encoded video recording and/or the flow rate of an encoded video signal.

An encoder of a video signal may encode the signal according to a specific quantization step, a specific display resolution, and a specific frame rate compatible with a target receiving node. Alternatively, an encoder of a video signal may encode the signal according to a nominal quantization step, a nominal display resolution, and a nominal frame rate to be further transcoded into a different quantization step, a different display resolution, and/or a different frame rate.

Transcoding may be necessitated by the capability of a receiving node, the capacity of a communication path to a receiving node, or both. Several originating nodes, each having a respective encoder, may direct initially encoded video signals to a shared signal adaptation node to be individually re-encoded (transcoded) and directed to respective receiving nodes.

Encoding a video signal, or transcoding an already encoded video signal, for delivery to a target receiving node sometimes requires initial processes of acquiring characteristics of the receiving node to determine an upper bound of display resolution, and an upper bound of frame rate. It is also desirable to determine properties of the video signals, such as a classification according to rate of temporal image variation which may influence the selection of the encoding parameters. Classification of a video signal may be based on a representative rate of temporal variation, a quantifier of spectral content in terms of bandwidth occupied by the signal, or some indicator of scene variation rate. In other cases, transcoding may be performed between an old format to a more recent one with better compression capabilities, regardless of the characteristics of the receiving node, to reduce the size of an encoded video recording and/or the flow rate of an encoded video signal.

In H.264, the basic processing unit is the macroblock (MB) and represents a block of 16×16 samples. Each MB has a prediction mode (intra, inter or skip). An intra MB supports 2 partition modes: 16×16 and 4×4 and these modes support respectively 4 and 9 spatial prediction modes. An inter MB must be partitioned into 16×16, 16×8, 8×16 or 8×8 blocks. An 8×8 block can be sub-partitioned in 8×4, 4×8 or 4×4 blocks. Each inter block has its own motion vector (MV). The skip MB is a special case of an inter MB encoded with the predicted MV and without residual data.

In HEVC, the basic processing unit is the coding tree unit (CTU), which has a maximum block size of 64×64 pixels and is represented by a quadtree structure. Each node of the quadtree is associated with a coding unit (CU) denoted $C_{i,j}$, where j is the jth CU at depth level i. The quadtree maximum depth is 4 and the CU minimum size is 8×8. When a CU $C_{i,j}$ is split, its children correspond to sub-CUs $C_{i+1, 4j+k}$, with k=0 . . . 3.

SUMMARY

A fast intermodal, H.264 to HEVC, transcoder based on a novel motion propagation process and a fast mode decision process is disclosed. The motion propagation process creates a set of motion vector candidates at the coding tree unit (CTU) level and selects the best candidate at the prediction unit level. The motion propagation algorithm requires no motion refinement and eliminates motion estimation computational redundancy. Redundant computation is avoided by pre-computing the prediction error of each candidate at the CTU level and reusing the information for various partition sizes. The fast mode decision process is based on a post-order traversal of the CTU quadtree. In particular, the process permits early termination of the complex rate distortion cost computation. The decision regarding splitting a coding unit is based on a novel recursive process. A motion-based split decision method is also disclosed.

The fast mode decision process is improved by reusing information created by the motion propagation algorithm during a CTU initialization. A method for computing a lower bound for motion cost given a partitioning structure is also disclosed. The method considers the motion prediction parameters to be unknown and computes the lower bound by reusing the prediction errors pre-computed by the motion propagation. The bound is exploited in a novel CTU split decision process.

In accordance with an aspect, the present invention provides a method for transcoding a succession of type-1 images compressed according to a first compression mode to type-2 images compressed according to a second compression mode. The method is implemented by a hardware processor accessing a memory device storing software instructions.

The method comprises extracting descriptors of a current type-1 image of the succession of type-1 images and generating a reconstructed bitstream of the current type-1 image. Each type-2 image is logically partitioned into contiguous predefined image regions. For each predefined image region, motion-vector candidates of a current type-2 image are extracted from: (1) the current type-1 image; (2) a reference type-2 image corresponding to a prior type-1 compressed image (if any); and (3) a synthesized part of the type-2 current image.

To reduce the computational effort, a cache of prediction errors is created for each motion-vector candidate for each predefined cell of each predefined image region. The prediction errors are determined in terms of deviation from the reconstructed bitstream.

For a predefined segment of a predefined image region under consideration and for each motion-vector candidate, a respective prediction error is determined using the cached cell prediction errors. A preferred motion-vector candidate of least prediction error is selected for the predefined segment for inclusion in a data stream representing the compressed type-2 image.

For a predefined image region of size M×M pixels, M≥16, candidate motion vectors may be extracted from an area of size (M+2×j×Δ)×(M+2×j×Δ) pixels within the current type-1 image, where Δ=4 and j is a positive integer not exceeding a predefined upper bound.

Each type-2 image may be logically partitioned into contiguous image regions and the synthesized part of the type-2 current image comprises image regions which have already been fully synthesized and which satisfy a predefined proximity to a predefined image region under consideration. The predefined proximity is a chessboard distance of 1.

The predefined cell is of size 4×4 pixels, and with a predefined image region of size M×M pixels, M being an integer multiple of 4, the cache of prediction errors would include an (M/4)×(M/4) matrix of cells for each motion-vector candidate. Each cell holding a prediction error based on deviation of synthesized cell data from a corresponding content of the reconstructed bitstream.

The method further comprises formulating an uncompressed type-2 image based on the preferred motion-vector candidate and determining a revised residual-data component of the preferred motion-vector candidate with reference to the uncompressed type-2 image. A compressed type-2 image is then formulated based on the preferred motion-vector candidate and the revised residual-data component.

In one implementation, the type-1 compression mode complies with the H.264 standard and the type-2 compression mode complies with the HEVC standard. The predefined image region is a block of pixels defined according to the second compression mode and the HEVC standard defines the image region as a block of M×M pixels, with M having a maximum value of 64.

In accordance with another aspect, the invention provides an apparatus employing a hardware processor for transcoding a succession of type-1 images compressed according to a first compression mode to type-2 images compressed according to a second compression mode. The apparatus comprises an augmented type-1 decoder, a transcoder kernel, and an augmented type-2 encoder.

The augmented type-1 decoder is devised to generate descriptors and a reconstructed bitstream of a received current type-1 image of the succession of type-1 images.

The transcoder kernel is devised to extract, for each predefined image region, motion-vector candidates of a current type-2 image. To reduce processing effort, the transcoder kernel is devised to create a cache of prediction errors, determined with reference to the reconstructed bitstream, for each motion-vector candidate for each predefined cell of a predefined region under consideration. The transcoder kernel is further devised to determine for each predefined segment of a predefined region under consideration and for each motion-vector candidate a respective prediction error using the cached prediction errors. The transcoder kernel then selects a preferred motion-vector candidate of least prediction error.

The augmented type-2 encoder is devised to use the preferred motion-vector candidate of the predefined segment under consideration in formulating a compressed type-2 image.

The sources of the motion-vector candidates comprise at least one of: the current type-1 image; a reference type-2 image corresponding to a prior type-1 compressed image; and a synthesized part of the type-2 current image.

The augmented type-2 encoder is further devised to formulate an uncompressed type-2 image based on the preferred motion-vector candidate and determine a revised residual-data component associated with the preferred motion-vector candidate with reference to the uncompressed type-2 image. The augmented type-2 encoder is devised to formulate the compressed type-2 image based on the preferred motion-vector candidate and the revised residual-data component.

The apparatus may be devised to handle a type-1 compression mode that complies with the H.264 standard and a type-2 compression mode that complies with the HEVC standard.

The transcoder kernel is devised to extract motion-vector candidates from an area of size (M+2×j×Δ)×(M+2×j×Δ) pixels within the current type-1 image. Each predefined image region being of size M×M pixels, M≥16, Δ=4 and j is a user-defined positive integer not exceeding a predefined upper bound.

The transcoder kernel is further devised to extract a subset of the motion-vector candidates from selected predefined image regions of the current type-2 image. Each selected predefined image region has a predefined proximity to the predefine image region under consideration, with each type-2 image being logically partitioned into contiguous image regions. The proximity is preferably user defined and expressed as a chessboard distance.

The cache of prediction errors comprises an (M/4)×(M/4) matrix of cells for each motion-vector candidate, each cell holding a prediction error based on deviation of synthesized cell data from a corresponding content of the reconstructed bitstream, where the predefined image region is of size M×M pixels, M being an integer multiple of 4, and the predefined cell is of size 4×4 pixels.

BRIEF DESCRIPTION OF THE DRAWINGS

Embodiments of the present invention will be further described with reference to the accompanying exemplary drawings, in which.

TERMINOLOGY AND NOTATION

Figure 1:
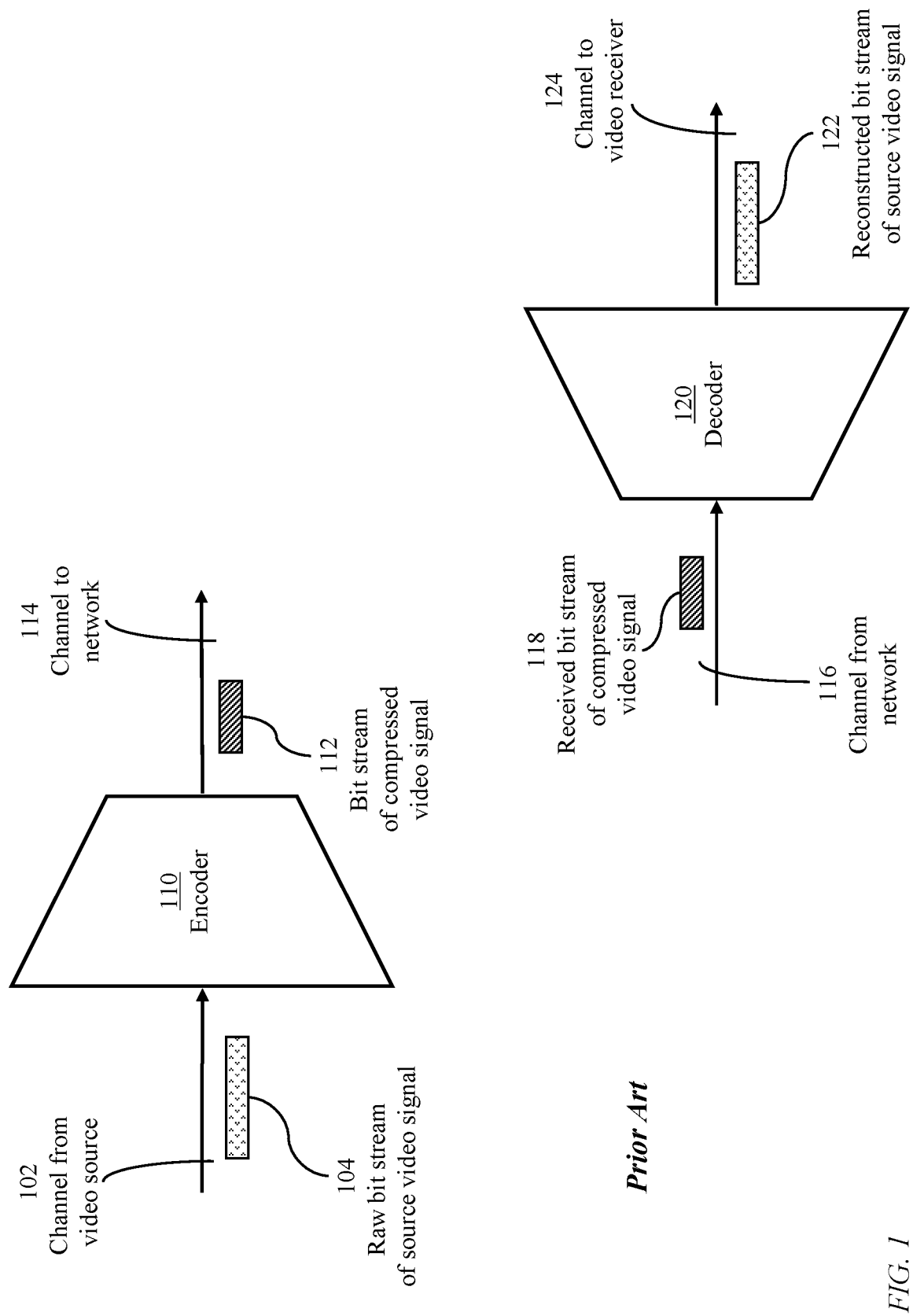
FIG. 1 illustrates a conventional encoder and a conventional decoder operating according to a same compression/decompression scheme.

Image: An image is a picture displayed during one time frame; the time domain is organized into adjacent time frames. The number of video signal samples transduced to pixels (picture elements) of an image defines the image's resolution. This may vary significantly from a moderate 720×480 (width of 720 pixels and height of 480 pixels) to 8192×4320.

Cell or Base block: A cell is the smallest recognizable partition of a CTU which may be associated with a motion vector. A cell may also be referenced as a "base block" and is selected to be of dimension 4×4 pixels.

Macroblock: In accordance with the H.264 standard, an image (a picture) is divided into macroblocks of dimension 16×16 each.

CTU: In accordance with the HEVC (H.265) standard, an image (a picture) is divided into Coding-tree units (CTUs) of dimension 64×64 pixels each. A CTU may be further divided into coding units (CUs) of different dimensions. It is noted, however, that the size of CTU may be defined in the picture header. The CTU size may be defined as 8×8, 16×16, 32×32, and 64×64.

Synchronous images (frames): Two or more images corresponding to a same time window of a video signal which may be encoded according to different encoding schemes are referenced as synchronous images. Thus an image of index n of a succession of images of a video stream encoded according to the H.264 standard and another image of the same index n of a succession of images encoded according to the HEVC standard are synchronous images. (The terms frame and image may be used synonymously).

Collocated blocks: Pixel blocks occupying congruent regions of identical spatial coordinates are referenced as collocated blocks.

Synchronous blocks: Two or more pixel blocks which belong to synchronous images and are spatially collocated within the synchronous images are referenced as synchronous blocks.

Motion compensation: Motion compensation is a method used to predict an image or a portion of an image, of a succession of images, based on reference images (or portions of images) which may include at least one preceding image (or image portion) and/or at least one succeeding image (or image portion) where the succession of images are considered to be somewhat correlated.

H.264: H.264 is a block-oriented video compression standard developed by ITU (International Telecommunication Union) and ISO (International Organization for Standardization).

HEVC: HEVC (acronym of "High Efficiency Video Coding") is a video compression standard, developed by ITU and ISO, based on variable-block-size segmentation. HEVC provides improvements over prior video-compression standards in terms of a reduced bitrate (a higher compression ratio) and handling higher resolutions (up to 8192×4320 pixels per image).

Image partition: An image may be segmented into spatial partitions of different shapes and dimensions to facilitate reuse of encoded portions of a current image in "predicting" portions of a succeeding image or predicting portions of neighbouring portions of the current image.

Partition shape: A partition may assume any shape provided the shapes of partitions of an image permit contiguous coverage of the image. The partition shapes considered in the present inventions are rectangular (including square) shapes.

Partition dimension: A partition dimension is expressed as the number of pixels per row and the number of rows of the (rectangular) partition. Thus, a 16×8 partition has a width of 16 pixels and a height of 8 pixels.

Partitioning mode: A macroblock (H.264) or a CTU (HEVC) may be partitioned in numerous patterns, each pattern exhibiting partitions of similar or different shapes. Information characterizing the partitions of a macroblock or a CTU need be communicated from an encoder to a decoder to facilitate reconstructing the image.

Prediction unit: A CTU may be logically divided into "prediction units", where each prediction unit is associated with a motion vector, or more generally to a prediction parameter.

Prediction type: The term "prediction type" of a prediction unit refers to the type of the source of the prediction mode associated with the prediction unit. The source may be another reference image, preceding or succeeding a current image (inter prediction), or neighbouring portions of the current image (intra prediction).

Intra-frame: The term refers to a frame using exclusively intra prediction types.

Inter-frame: The term refers to a frame using inter prediction types and possibly using some intra prediction types as well.

Prediction mode: The term "prediction mode" refers to a prediction parameter (a motion vector for inter prediction or a prediction index for intra-frame prediction).

Compression mode: The term "compression mode" of a designated image portion, whether the image portion is a macroblock (H.264) or a CTU (HEVC), refers to the combination of partitioning mode and prediction type of the designated image portion. For example, in a first compression mode, a CTU may be partitioned into a mixture of coding units (CUs) of dimensions 32×32, 16×8, and 8×8 where all the 8×8 partitions are associated with intra prediction types. In a second compression mode, the CTU may be partitioned into the same mixture of coding units (CUs) of dimensions 32×32, 16×8, and 8×8 but with at least one of the 8×8 partitions being associated with an inter prediction type. The second compression mode is distinct from the first compression mode due to the differing prediction mode of one of the 8×8 partitions.

Descriptor: The term "descriptor" refers to the combination of partitioning mode, prediction mode, and residual information for a designated image portion.

Intermodal transcoding: The process of converting a compressed bitstream formulated according one compression mode to a compressed bitstream formulated according to another compression mode is herein called an "intermodal transcoding". For example, converting a compressed bitstream formulated according to the H.264 standard to a compressed bitstream formulated according to the HEVC standard is an intermodal transcoding process.

Intermodal motion vector: A motion vector extracted from the source H.264 frame synchronized (corresponding to the same time) with the current destination HEVC frame to encode. The motion vectors associated with the source image corresponding to the same video signal as the current image which is encoded according to a different compression standard, are herein referenced as an "intermodal motion vectors"

Prior motion vector: A motion vector extracted from a reference image (a previously encoded HEVC frame) is herein referenced as a "prior HEVC motion vector".

Raw bitstream: The bitstream generated directly from samples of a signal received from a signal source, where each sample is represented by a respective string of bits, is called a "raw bitstream".

Compressed bitstream: A raw bitstream representing a video signal may occupy a large spectral band in a communication channel or require a large storage capacity. If the raw bitstream includes redundant bits, which is likely to occur when the bitstream represents a succession of images, the bitstream may be encoded to capture long strings of bits using (much) fewer bits.

Reconstructed bitstream: The process of recovering the original raw bitstream from a corresponding compressed bit stream, performed at a decoder, produces a "reconstructed bitstream". In an ideal streaming system with lossless compression and loss transmission, the reconstructed bitstream would be a delayed replica of the raw bitstream. In a practical streaming system, the reconstructed bitstream produces a succession of images which approximates the original succession of images.

Decompressed bitstream: The terms decompressed bitstream and reconstructed bitstream are used synonymously.

Signal: A data stream occupying a time window is herein referenced as a "signal". The duration of the time window may vary from a few microseconds to several hours.

Encoding parameters: Encoding a signal produced by a signal source into a digital encoded format entails selecting several parameters to represent the signal in the encoded format. The encoding process entails two successive stages: signal representation modification and signal compression. In the first stage, the signal's representation is modified if it is required or desired. In the second, the resulting signal is compressed to reduce its bit rate. The parameters used in the first stage are called signal representation parameters while the ones used in the second stage are called compression parameters. Together, they form the encoding parameters. The signal representation parameters affect the signal's intrinsic characteristics before compression such as sampling rate for audio or display resolution and frame rate for video. The compression parameters affect how the compression stage is performed and include the quantization step. A video signal is encoded in a format suitable for display on a screen as a succession of images (frames).

Fidelity: A source signal, i.e., a signal generated at a signal source, is encoded into an "encoded signal". An encoded signal is decoded at a decoder to produce a "detected signal". The degree of resemblance of the detected signal to the source signal, herein called "fidelity", is a measure of encoding quality. Fidelity may be determined based on human perception or by some automated means. The highest realizable fidelity corresponds to the boundary values of encoding parameters.

SATD: SATD is an acronym of "sum of absolute transformed differences".

DETAILED DESCRIPTION

FIG. 1 illustrates a conventional encoder 110 and a conventional decoder 120 operating according to a same compression mode. Encoder 110 receives, from a channel 102, a raw bitstream 104 representing a video signal from a video source and encodes the raw bitstream 104 according to a specified compression mode to produce a compressed bitstream 112 of a lower bitrate. The compressed bitstream 112 is communicated through a channel 114 to a destination receiver coupled to a decoder. Decoder 120 receives from a channel 116 a compressed bitstream 118 produced from a raw bitstream which has been encoded according to a specific compression mode, such as the compression mode of the H.264 standard, to produce a reconstructed bitstream 122 approximating the raw bitstream. The reconstructed bitstream is communicated through a channel 124 to a video-display device.

Figure 2:
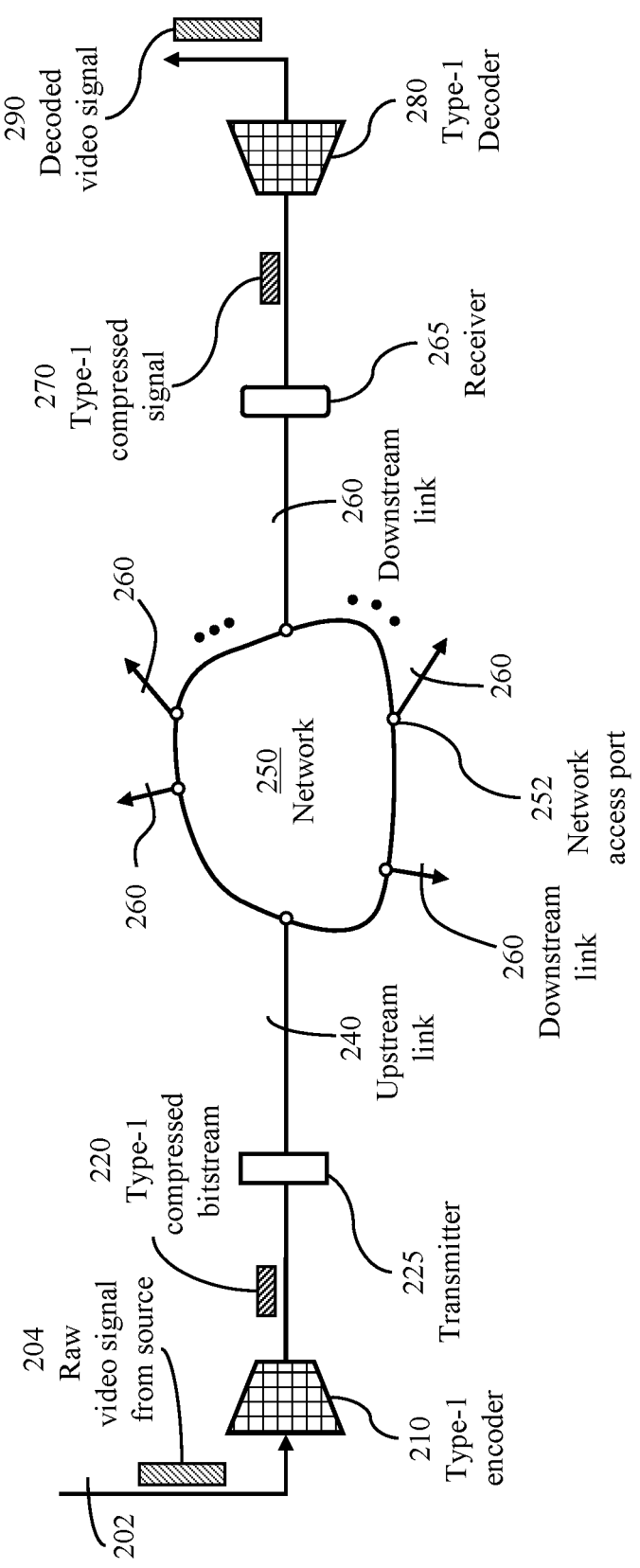
FIG. 2 illustrates an encoder, labelled a type-1 encoder, devised to encode video signals according to a first video compression mode and multicasting, through a transmitter and a network, compressed video signals to receivers coupled to respective type-1 decoders.

FIG. 2 illustrates an encoder 210, labelled a type-1 encoder, devised to encode a raw bitstream 204, representing a video signal received from a channel 202, according to a first specified video compression mode, such as the compression mode of the H.264 standard, to produce a compressed bitstream 220, labelled "type-1 compressed bitstream". The compressed bitstream 220 is communicated through a transmitter 225 and an upstream channel 240 to a network 250 to be multicast through downstream channels 260 to destination receivers 265 each of which being coupled to a respective decoder 280. A decoder 280 is devised to receive a compressed bitstream 270 which is a delayed replica or approximation of compressed bitstream 220. The decoder 280, labelled a type-1 decoder, is devised to decompress the compressed bitstream formed according to the first specified video compression mode to produce a reconstructed bitstream approximating the raw bitstream 204. The reconstructed bitstream 290 is communicated through a channel to a video display device.

Figure 3:
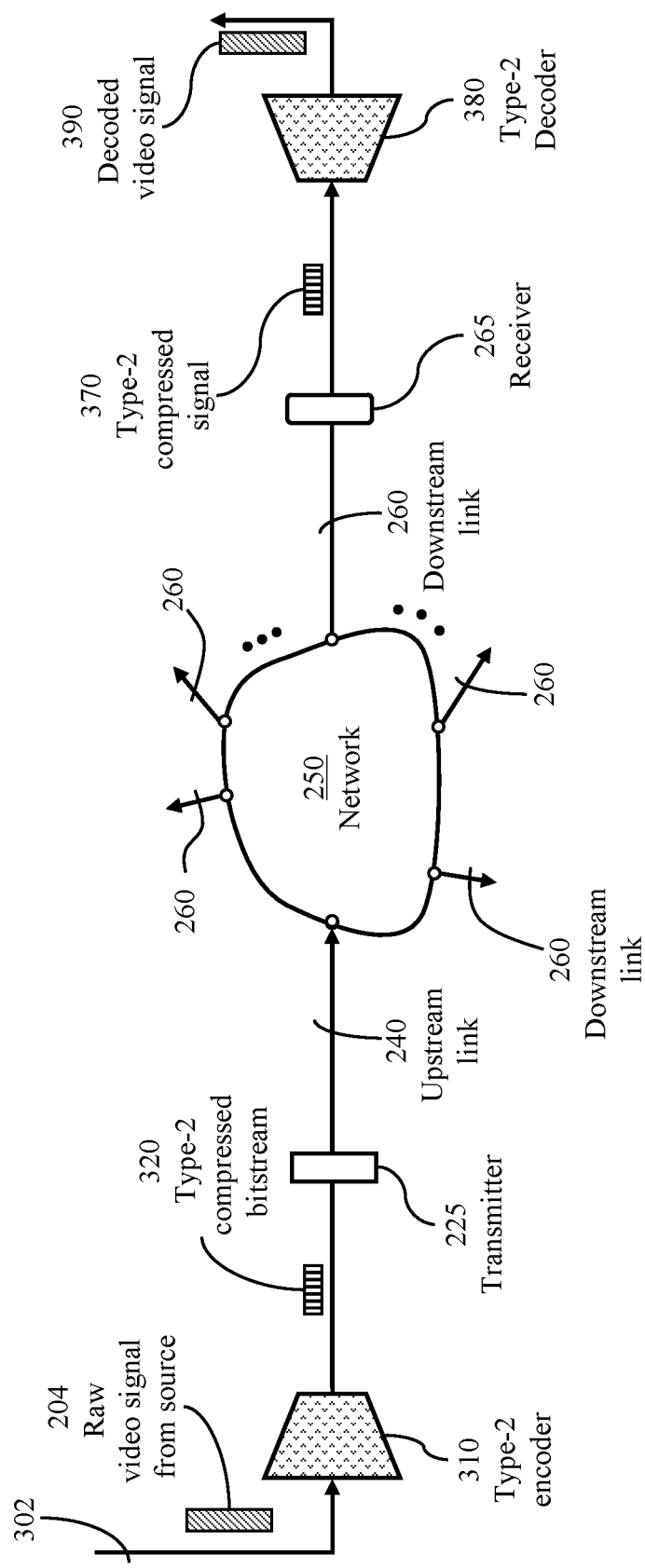
FIG. 3 illustrates an encoder, labelled a type-2 encoder, devised to encode video signals according to a second video compression mode and multicasting, through a transmitter and a network, compressed video signals to receivers coupled to respective type-2 decoders.

FIG. 3 illustrates an encoder 310, labelled a type-2 encoder, devised to encode a raw bitstream 204, representing a video signal received from a channel 302, according to a second specified video compression mode, such as the compression mode of the HEVC (H.265) standard, to produce a compressed bitstream 320, labelled a "type-2 compressed bitstream". The compressed bitstream 320 is communicated through a transmitter 225 and an upstream channel 240 to a network 250 to be multicast through downstream channels 260 to destination receivers 265 each of which being coupled to a respective decoder 380. A decoder 380 is devised to receive a compressed bitstream 370 which is a delayed replica or approximation of compressed bitstream 320. The decoder 380, labelled a type-2 decoder, is devised to decompress the compressed bitstream formed according to the second specified video compression mode to produce a reconstructed bitstream approximating the raw bitstream 204. The reconstructed bitstream 390 is communicated through a channel to a video display device.

Figure 4:
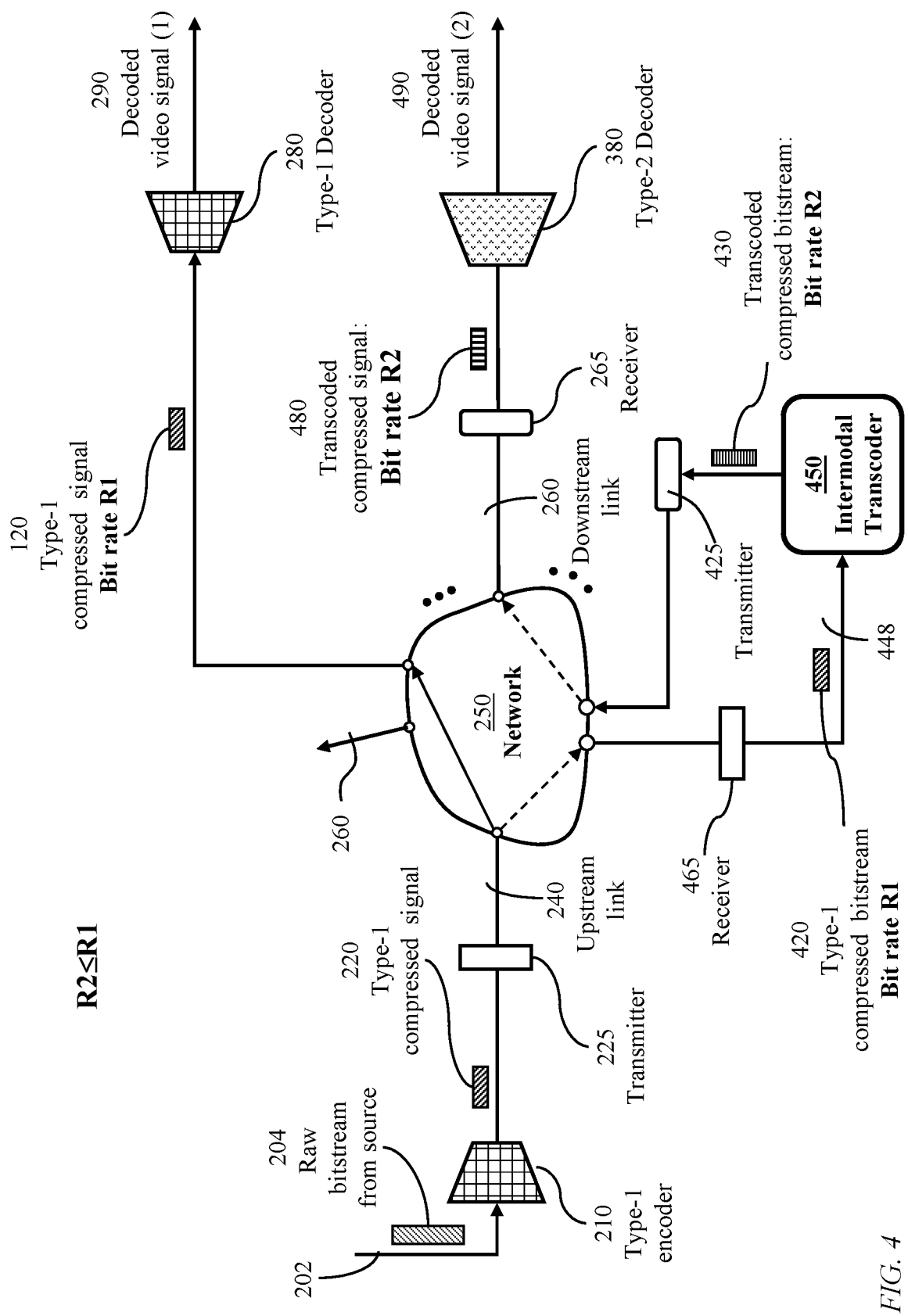
FIG. 4 illustrates a type-1 encoder multicasting, through a transmitter and a network, video signals to multiple receivers where at least one of the receivers is coupled to a type-2 decoder, for use in an embodiment of the present application.

FIG. 4 illustrates a type-1 encoder 210 receiving a raw bitstream 204 from a channel 202 and producing a type-1 compressed bitstream 220 communicated through a transmitter 225 and an upstream channel 240 to a network 250 to be multicast through downstream channels 260 to destination receivers 265 coupled to respective type-1 decoders 280 or to destination receivers 265 coupled to respective type-2 decoders 380 through an intermodal transcoder 450. A receiver 465 coupled to a network port of network 250 directs a type-1 compressed signal 420, which is a delayed replica or approximation of type-1 compressed bitstream 220, through channel 448 to intermodal transcoder 450 which produces a type-2 compressed bitstream to be transmitted through channel 452 and transmitter 425 and network 250 to a respective receiver 265 coupled to a type-2 decoder 380. A decoder 280 produces a bitstream 290 which is a reconstructed approximation of raw bitstream 204, and a decoder 380 produces a bitstream 490 which is another reconstructed approximation of raw bitstream 204.

Figure 5:
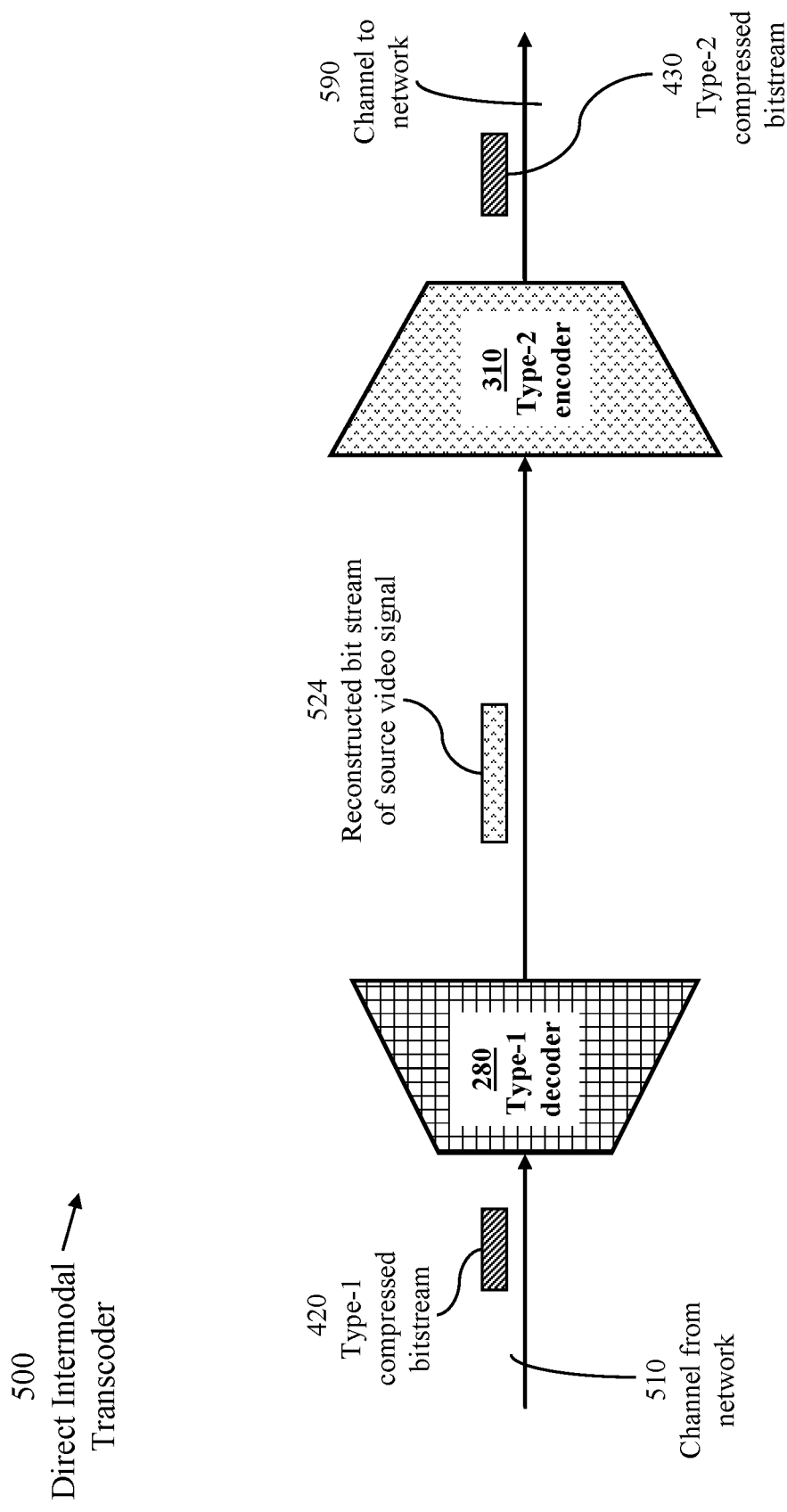
FIG. 5 illustrates a direct intermodal transcoder comprising a type-1 decoder and a type-2 decoder.

As illustrated in FIG. 4, a type-1 encoder 210 compresses a raw bitstream 204 and the resulting compressed bitstream is multicast to a number of receivers including a receiver coupled to intermodal transceiver 450. FIG. 5 illustrates a known implementation 500 of intermodal transceiver 450 in which a type-1 decoder 280 decompresses a type-1 compressed bitstream 420 received through a channel 510 to reconstruct the raw bitstream 204. The type-1 decoder 280 produces a reconstructed bitstream 524 which is compressed using a type-2 encoder 310 to produce a type-2 compressed bitstream 430. The compressed type-2 bitstream 430 may be multicast to a number of receivers coupled to respective type-2 decoders. This direct transcoding process is computationally intensive.

Figure 6:
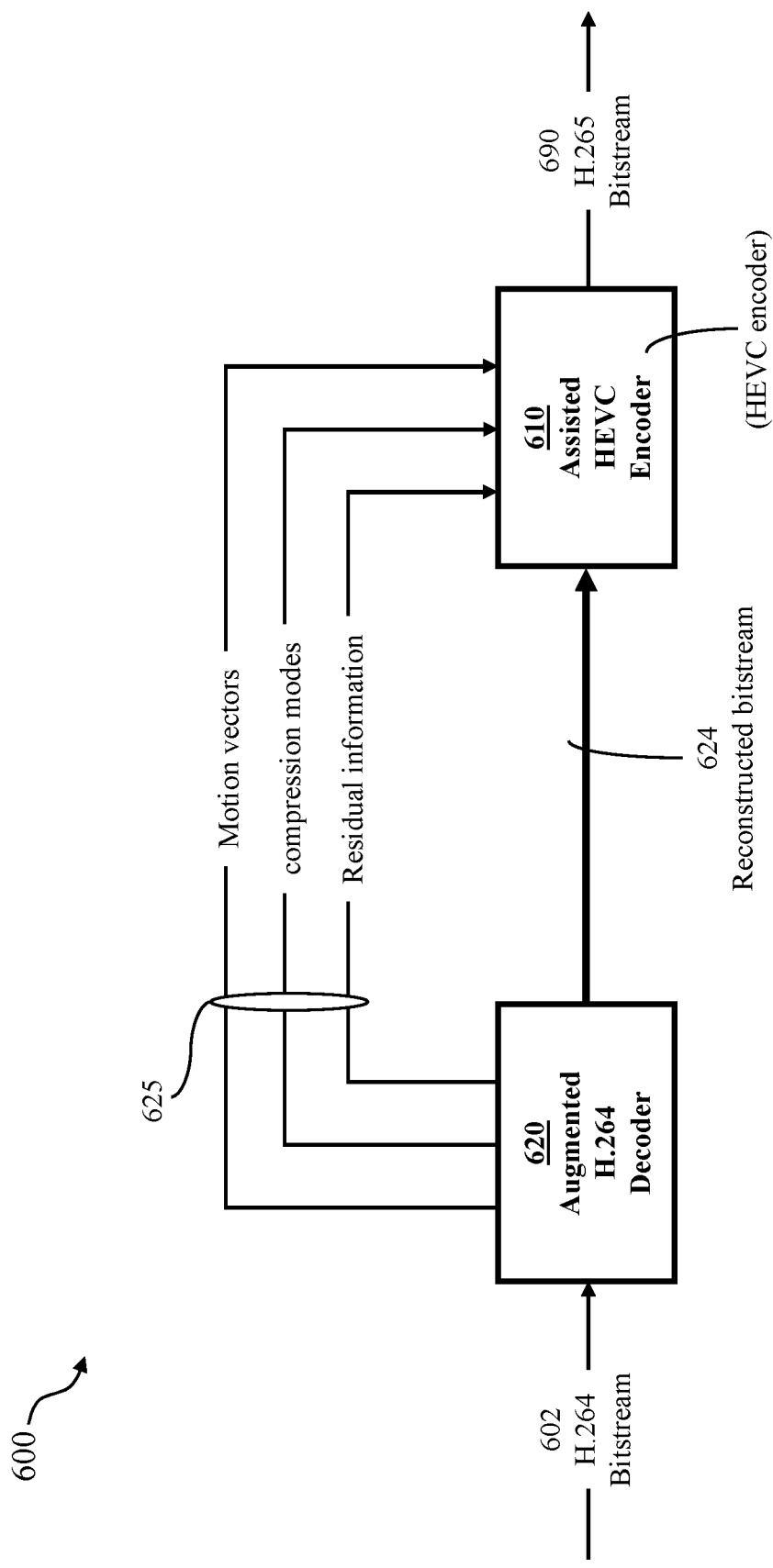
FIG. 6 illustrates an intermodal transcoder comprising an augmented type-1 decoder and an assisted type-2 encoder. The augmented type-1 decoder is devised to decode video signals compressed according to the standardized H.264 compression mode to produce a reconstructed bitstream. The assisted type-2 decoder is devised to use both the H.264 compression modes and the reconstructed bitstream to produce a bitstream compressed according to the standardized HEVC compression mode.

As illustrated in FIG. 1, the only input of an encoder is a raw bitstream and the only output of a decoder is a reconstructed bitstream approximating the raw bitstream of the encoder. FIG. 6 illustrates an intermodal transcoder 600 comprising an augmented type-1 decoder 620 and an assisted type-2 encoder 610. The augmented type-1 decoder is devised to decode video signals compressed according to the standardized H.264 compression mode to produce a reconstructed bitstream 624. The augmented type-1 decoder also extracts compression data 625 from the type-1 input compressed bitstream. The extracted compression data 625 relates to the partitioning mode and prediction modes of the original raw bitstream, the motion vectors, and residual data. The assisted type-2 decoder is devised to use both the reconstructed bitstream 624 and extracted compression data 625 to produce a compressed bitstream 690 according to the standardized HEVC compression mode. The resulting compressed bitstream 690 may be multicast to a number of receivers.

Figure 7:
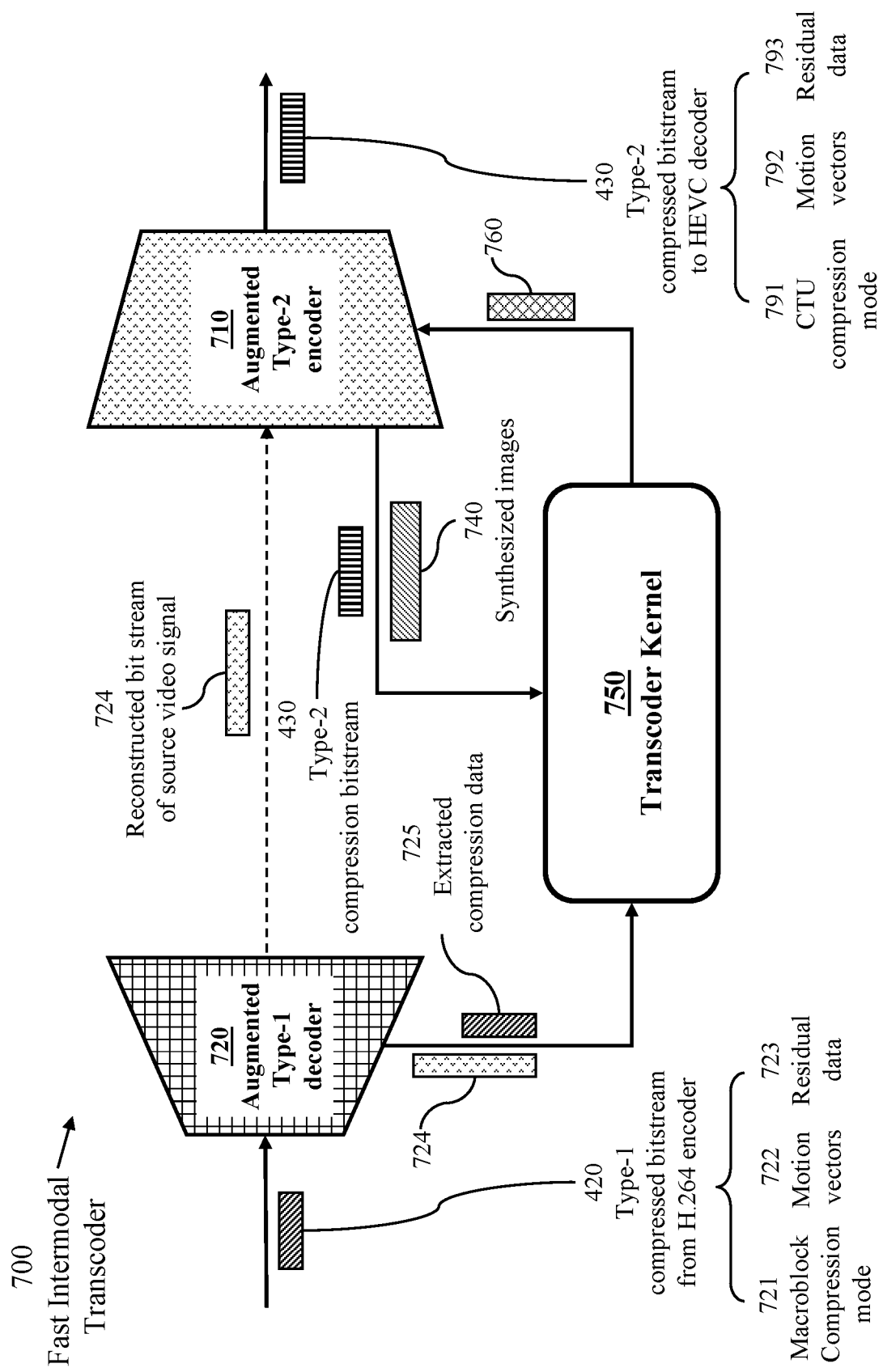
FIG. 7 illustrates an intermodal transcoder for converting a video signal encoded according to a first video-compression mode to a video signal encoded according to a second video-compression mode, in accordance with an embodiment of the present invention.

FIG. 7 illustrates a fast intermodal transcoder 700 for converting a compressed bitstream 420 received from an input channel and formed according to a type-1 compression mode to a compressed bitstream 430 formed according to a type-2 compression mode and communicated through an output channel. The fast intermodal transcoder 700 comprises an augmented type-1 decoder 720, a transcoder kernel 750, and an augmented type-2 encoder. The augmented type-1 decoder 720 acquires the compressed bitstream 420 and produces a reconstructed bitstream (decompressed bitstream) 724 in addition to extracted data 725 including compression modes, motion vectors, and residual data.

The augmented type-2 encoder 710 uses the compression modes data 760 from the transcoder kernel 750 to produce the type-2 compressed bitstream 430 in addition to a bit stream 740 representing synthesized images. The transcoder kernel 750 uses the extracted data 725 in addition to the reconstructed bitstream 724 and the bit stream 740 representing synthesized images to produce the compression modes data 760. Optionally, the reconstructed bitstream 724 may be directed to the augmented type-2 encoder 710.

In one implementation the augmented type-1 decoder is devised to decode video signals compressed according to the H.264 standard and the augmented type-2 encoder is devised to encode the reconstructed bitstream to produce a bitstream compressed according to the HEVC (H.265) standard. The augmented decoder 720 extracts H.264 compression information 725 which includes compression modes, motion vectors, and residual data to be used to produce a compressed bitstream according to the HEVC (H.265) standard.

Figure 8:
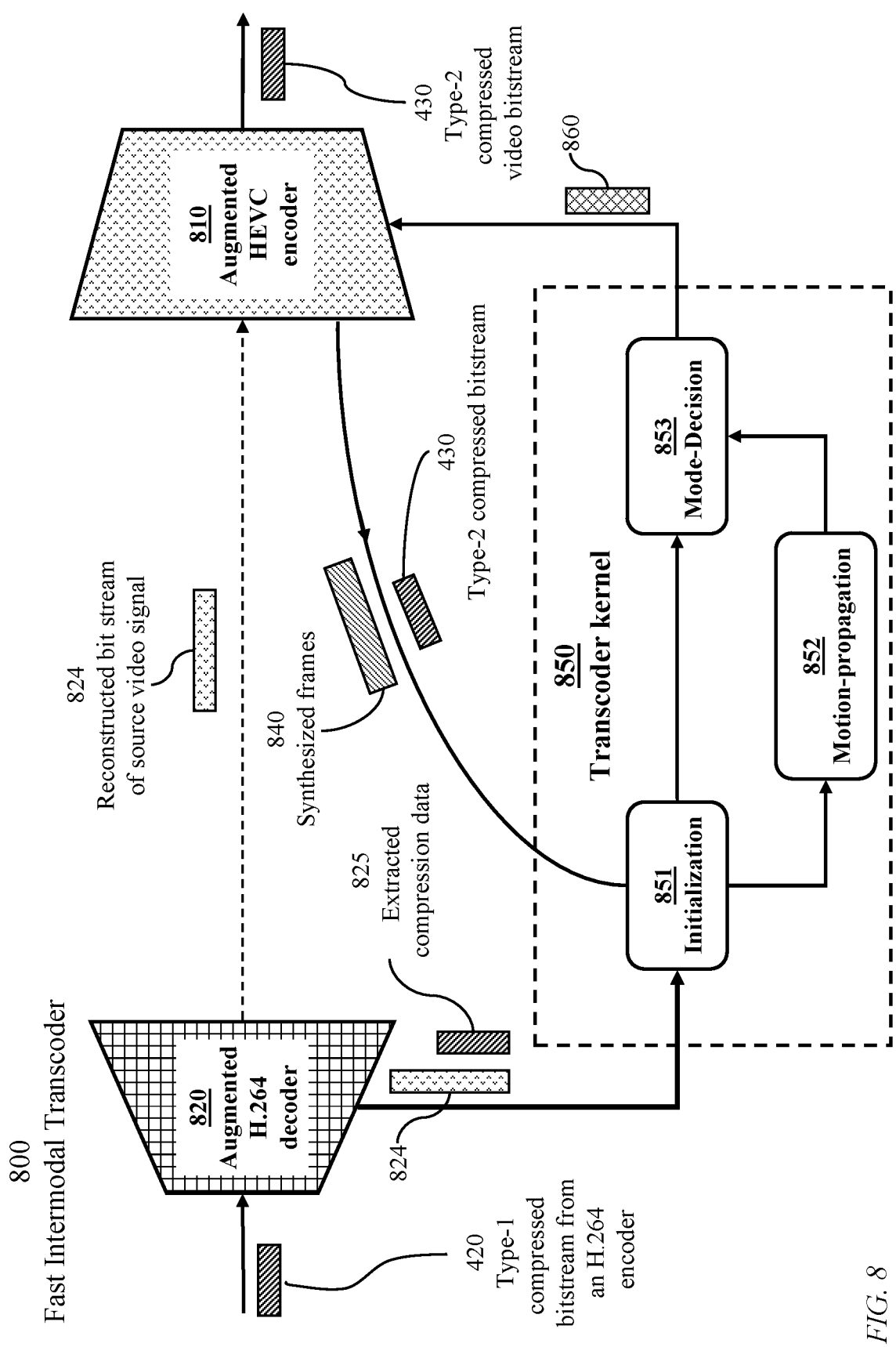
FIG. 8 illustrates components of an intermodal transcoder, in accordance with an embodiment of the present invention.

FIG. 8 illustrates basic components of a fast intermodal transcoder 800 similar to fast intermodal transcoder 700 where the input compressed bitstream 420 originates from an H.264 encoder and the output compressed bitstream 430 is directed to an HEVC decoder. The fast intermodal transcoder 800 employs at least one hardware processor and at least one memory device storing software instructions devised to cause the at least one processor to implement basic transcoding processes according to the present invention. The fast intermodal transcoder 800 comprises an augmented type-1 decoder 820, a transcoder kernel 850, and an augmented type-2 encoder 810.

The augmented H.264 decoder 820 acquires the compressed bitstream 420 and produces a reconstructed bitstream (decompressed bitstream) 824 in addition to extracted data 825 including H.264 compression modes, motion vectors, and residual data. The augmented HEVC encoder 810 uses the compression modes data 860 from the transcoder kernel 850 to produce the HEVC compressed bitstream 430 in addition to a bitstream 840 representing synthesized images. The transcoder kernel 850 uses the extracted data 825 in addition to the reconstructed bitstream 824 and bitstream 840 to produce the compression modes data 860. Optionally, the reconstructed bitstream 824 may be directed to the augmented type-2 encoder 810.

The transcoder kernel is organized into three main components: an initialization component 851, a motion-propagation component 852, and a mode-decision component 853. The initialization component 851 is devised to create motion vector candidates and determine cell-based prediction errors for each cell (of dimension 4×4) of a block of pixels under consideration for reuse in determining prediction errors of different candidate image partitions. The motion propagation component 852 is devised to use the motion vector candidates and the cell-based prediction errors to determine a preferred motion vector candidate for prediction units of arbitrary dimensions. The mode-decision component 853 is devised to determine whether a coding unit (CU) should be split into sub units and whether CUs should be aggregated to reduce the number of leaf-nodes of a coding tree. The mode-decision component performs additional functions including early processing termination and selection of prediction-unit (PU) candidates.

Figure 9:
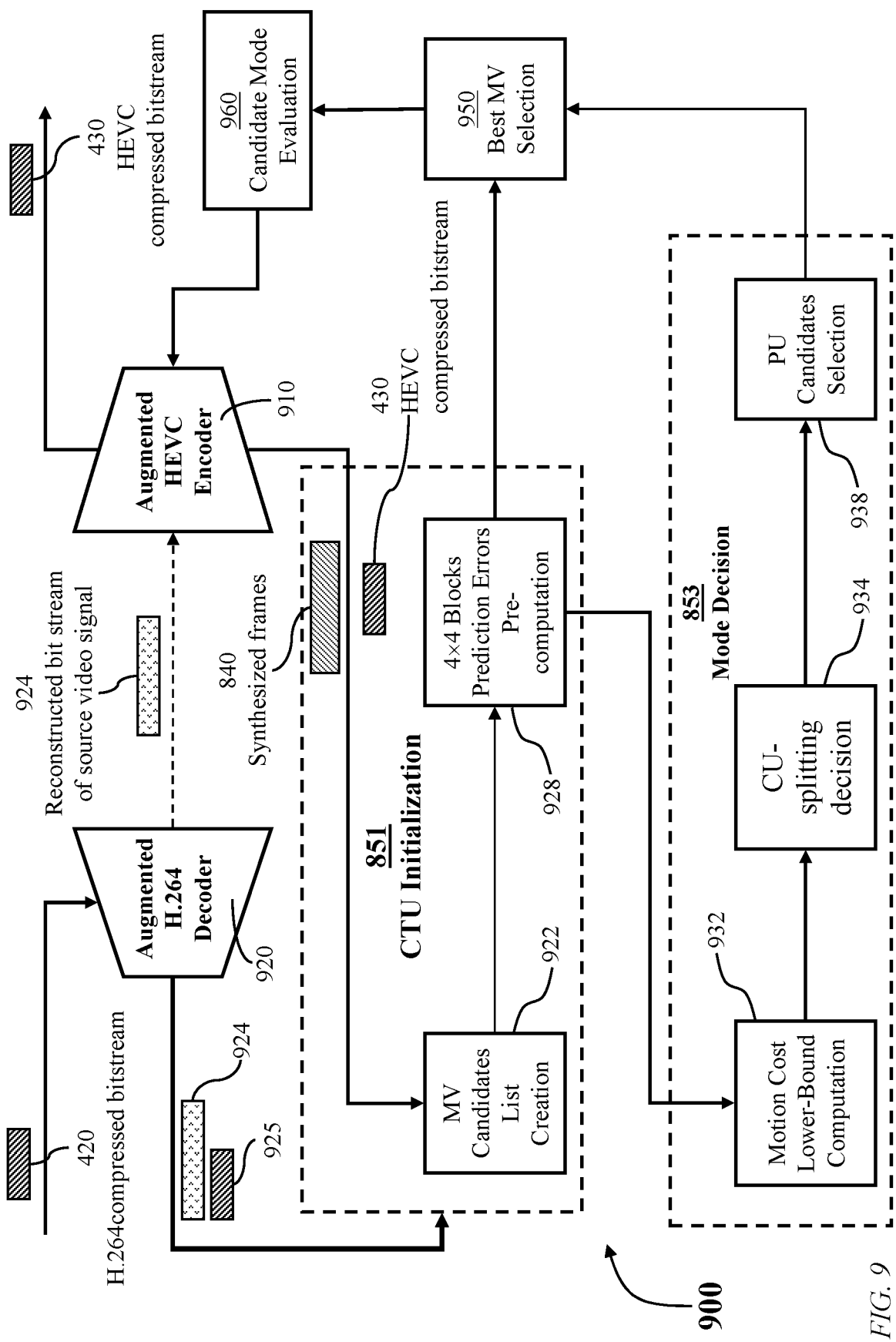
FIG. 9 illustrates basic modules of the intermodal transcoder of FIG. 8, in accordance with an embodiment of the present invention.

FIG. 9 illustrates a modular structure of an intermodal transcoder 900 similar to the intermodal transcoder of FIG. 8, as described below.

(1) An augmented H.264 decoder 920 (comparable to augmented type-1 decoder 820 of FIG. 8) which receives a compressed bitstream generated at an H.264 encoder.
(2) An augmented HEVC encoder 910 (comparable to augmented type-2 encoder 810 of FIG. 8).
(3) A module 922 for creating, for each CTU, a set of motion-vector candidates.
(4) A module 928 for determining, for each CTU, prediction errors for each cell (base block) and for each candidate motion vector.
(5) A module 932 for computing motion cost lower bounds.
(6) A module 934 for tentative splitting of coding units (CUs).
(7) A module 938 for prediction unit (PU) candidate selection.
(8) A module 950 for selecting a preferred PU candidate.
(9) A module 960 for evaluating a compression mode candidate.

The above modules are described below. Modules 3 to 9 form a transcoder kernel, comparable to transcoder kernel 850 of FIG. 8.

The following processor-executable instructions relate to some of the modules of FIG. 9. The "CU-PROCESS" procedure is a recursive procedure. For each CTU, this procedure is called by passing the parameter $C_{o,o}$, the root of the CTU.

```
1    procedure CU-PROCESS(Ci,j)
2        J_RD [C_i,j] ← J_PM [C_i,j] ← ∞
3        ▷ Recursively process the sub-CUs
4        if CU-SPLIT(Ci,j) (module 934)
5            J_RD [C_i,j] ← λ_mode · R_split
6            J_PM [C_i,j] ← λ_pred · R_split
7            for k ← 0 to 3
8                CU-PROCESS(C_{i+1,4j+k})
9                J_RD [C_i,j] ← J_RD [C_i,j] + J_RD [C_{i+1,4j+k}]
10               J_PM [C_i,j] ← J_PM [C_i,j] + J_PM [C_{i+1,4j+k}]
11       ▷ Process inter PUs of CU
12       for each m in CANDIDATE-MODES(Ci,j) (module 938)
13           J_PM [m] ← PU-PM-COST(C_{i,j},m) (module 950)
14           if (J_PM [m] < (J_PM [C_i,j] + T)
15               J_RD [m] ← PU-RD-COST(C_{i,j},m) (module 960)
16               if J_RD [m] < J_RD [C_i,j]
17                   J_RD [C_i,j] ← J_RD [m]
18                   J_PM [C_i,j] ← J_PM [m]
```

Augmented H.264 Decoder 920

The augmented H.264 decoder 920 receives a compressed bitstream 420 formulated according to the H.264 standard and produces a reconstructed bitstream 924 which is optionally directed to the augmented HEVC encoder 910. The augmented H.264 decoder 920 also extracts from the compressed bitstream 420 information relevant to compression modes, motion vectors, and residual data to be presented to module 922 of the CTU initialization component 951.

Augmented HEVC Encoder 910

Augmented HEVC encoder receives candidate modes from module 960 and the reconstructed bitstream 924 from the augmented H.264 decoder, and produces a compressed bitstream 430 complying with the HEVC standard.

Creating Motion Vectors Candidates per CTU, Module 922

For each CTU, module 922 creates a motion vector candidates list. The list includes H.264 and HEVC MVs extracted from a synchronous H.264 frame (the intermodal motion vectors) the preceding HEVC frame (the prior motion vectors), and the regions already processed in the CTU neighborhood (current motion vectors). Since a typical succession of video images contains several static regions, the null MV, denoted $MV_{(0,0)}$, is also added to the list. All duplicate MVs are removed from the list and the number of candidates is denoted K.

Pre-Computing Prediction Errors, Module 928

The following process is performed for each of the K motion vector (MV) candidates. For the kth MV candidate, the complete pre-computing process is divided into two steps. The first step interpolates the predicted CTU region, usually on a 64×64 region, since the MV has a quarter-pel precision. The second step computes the prediction error for each 4×4 blocks covering the CTU region. For a 4×4 block located at position (4x,4y) relative to the CTU upper left corner, the prediction error function is defined as:

$$E_{4\times 4}(x,y,k) = SATD(B_{x,y,k})|_{luma} + SATD(B_{x,y,k})|_{Cb} + SATD(B_{x,y,k})|_{Cr},$$

where $(B_{x,y,k})_{luma}$ denotes the difference between the predicted and the current 4×4 luma blocks at position (4x, 4y) for the kth MV candidate, with x, y∈Z≥0, $(B_{x,y,k})|_{Cb}$ and $(B_{x,y,k})|_{Cr}$ denote the difference for corresponding 4×4 chroma blocks.

At the PU level, the prediction errors of the 4×4 blocks covering the PU partition region are summed up to get the total prediction error. Hence, for a given PU of 4M×4N samples located at position (4x, 4y) relative to the CTU upper left corner, the prediction error of the kth MV candidate is computed as a double summation of $E_{4\times 4}(i,j,k)$ over x≤j<(x+M) and y≤j<(y+N).

Typically, the coding process involves finding the best combination of partitions and motion vectors. This process is called rate distortion optimization (RDO). Therefore, in the RDO process, various combinations of partition sizes will be evaluated and compared, and reusing prediction errors of the 4×4 blocks for a fixed list of motion vectors will permit to reduce the amount of computations. Other means of reducing computations include the process of deciding if a CU needs to be split to consider its sub-partitions or not. This process in handled by module 934.

Computing Motion Cost Lower Bounds, Module 932

The CU-MIN-COST function recursively computes a lower bound for $J_{PM}$ denoted $J_{min}$, given a CU Ci,j, a lower depth l, an upper depth u and the current depth c.

```
1   function CU-MIN-COST(Ci,j , l, u, c)
2       J_min ← ∞
3       if c ≥ l
4           ▷ Process inter PUs of CU Ci,j
5           for each mode in MODES-INTER(Ci,j )
6               J ← λ_pred · mode.R_min
7               for each partition in mode
8                   (x, y) ← partition.position
9                   (M, N) ← partition.size
10                  J ← J + min(E_{M×N} (x, y, k)|k = 1..K )
11              if J < J_min
12                  J_min ← J
13          if c < u
14              ▷ Recursively process the sub-CUs
15              c ← c + 1
16              J ← λ_pred · mode.R_Split
17              for k ← 0 to 3
18                  J ← J+ CU-MIN-COST(C_{i+1,4j+k} , l, u, c)
19              if J < J_min
20                  J_min ← J
21      return J_min
```

Tentative Splitting of Coding Units, Module 934

The CU-SPLIT function below determines whether or not CU Ci,j should be split t to evaluate sub-CUs.

```
1   function CU-SPLIT(Ci,j )
2       size ← CU-SIZE(C_{i,j} )
3       ssd ← A parameter defined in the configuration file
4       intra ← H.264-HAVEINTRA(C_{i,j} )
5       if size = 8 ▷ If maximal depth reached
6           return FALSE
7       if intra = TRUE or ssd = TRUE or size = 16
8           ▷ Structural split decision
9           if size = 16 and (H.264-DEPTH(Ci,j )=0)
10              return FALSE
11          else
12              return TRUE
13      else
14          ▷ Motion-based split decision
15          JE_NonSplit ← CU-MIN-COST(C_{i,j} ,i,i,i)
16          JE_Split ← CU-MIN-COST(C_{i,j} ,i + 1,3,i)
17          if JE_NonSplit < JE_Split
18              return FALSE
19          else
20              return TRUE
```

Selection of Prediction Unit Candidates, Module 938

Module 938 returns a list of PU modes to be evaluated by the current CU. The modes are returned in the following order:
  inter modes, from finer to coarser partitions;
  merge/skip modes, sorted in ascending order based on values of a cost function ($J_{PM}$); and
  intra modes, from coarser to finer partitions.

All inter modes are disabled when the collocated H.264 region has intra modes only. When the collocated H.264 region has no residual information, finer partitioning than H.264 is disabled in HEVC since the partitioning structure is already efficient in H.264.

Selection of a Preferred Prediction Unit Candidate, Module 950

Module 950 examines a list of PU candidates and for each inter partition, selects the best motion vector candidate. For each Inter PU candidate determined in module 938, module 950 selects best MV and computes motion cost. If the motion cost does not exceed a predefined threshold, the PU candidate is evaluated in module 960 to determine the R-D cost. If the R-D cost is lower than a current value of the best R-D cost, the PU becomes the best PU candidate.

Each of intermodal transcoders 450, 700, 800, and 900 comprises a hardware processor accessing memory devices storing processor-executable instructions which cause the hardware processor to transcode a succession of type-1 images compressed according to a first compression mode to type-2 images compressed according to a second compression mode. The term "hardware processor" generally refers to an assembly of hardware processors accessing at least one memory device.

Evaluation of Candidate Mode, Module 960

Module 960 evaluates a compression mode candidate and, where applicable, updates the best compression mode and aggregation of CUs defined in module 934.

Figure 10:
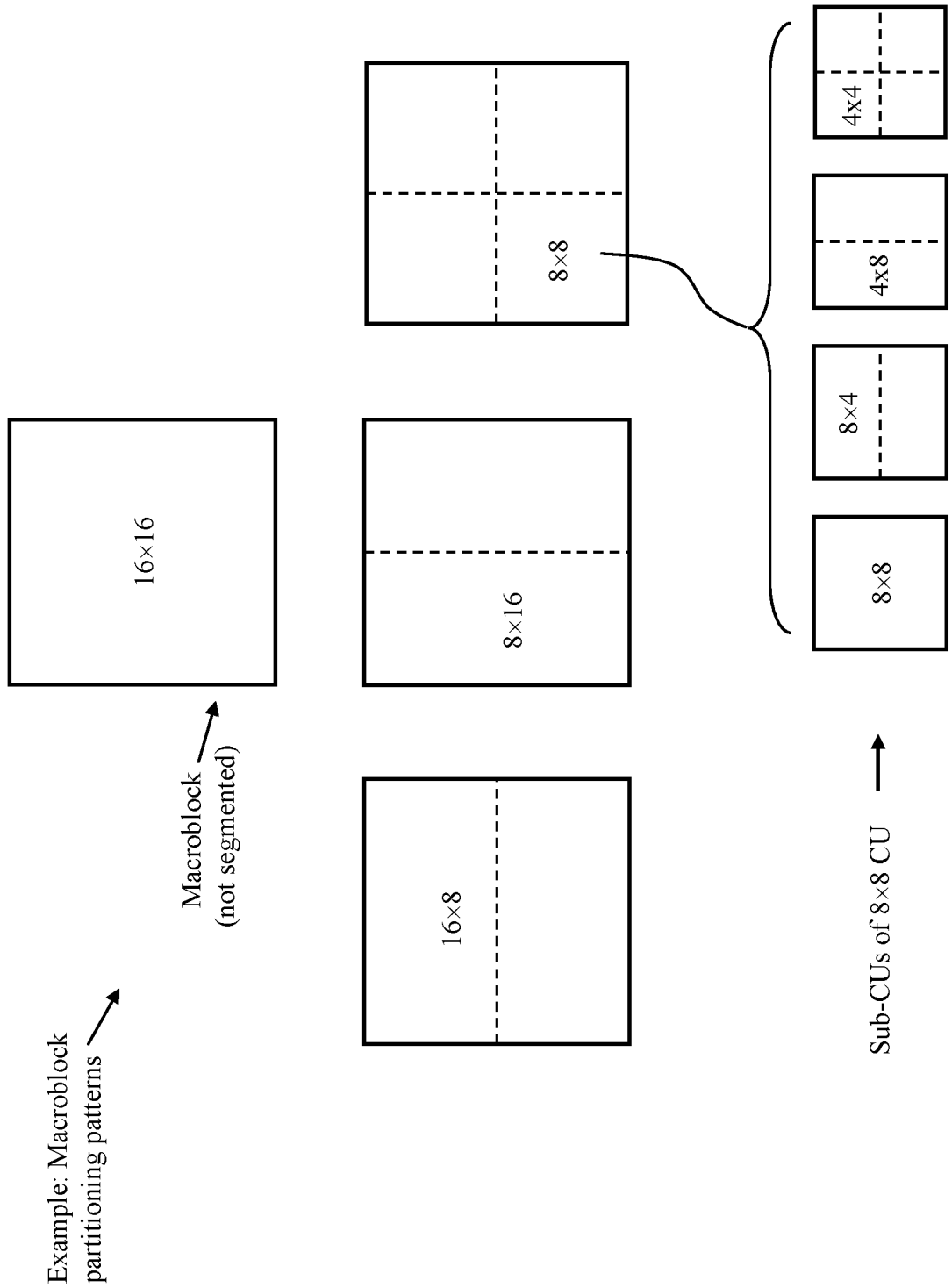
FIG. 10 and FIG. 11 illustrate image partitioning modes of one of the macroblocks of an image according to the H.264 standard.
Figure 11:
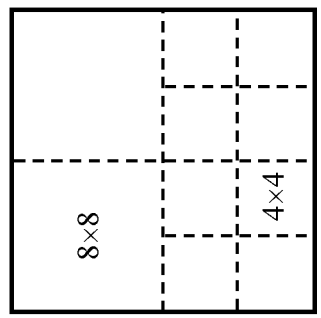
Figure 11:
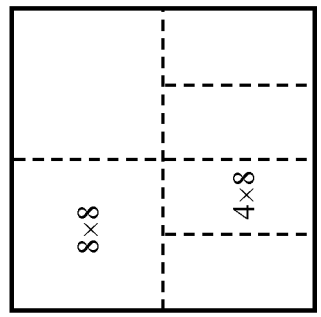
Figure 11:
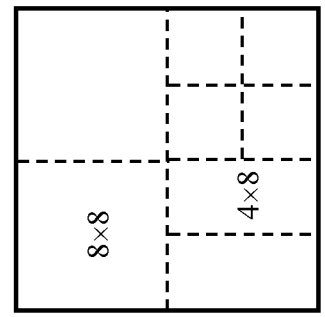
Figure 11:
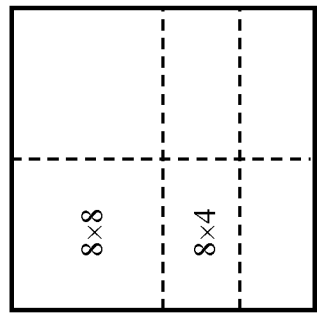
Figure 11:
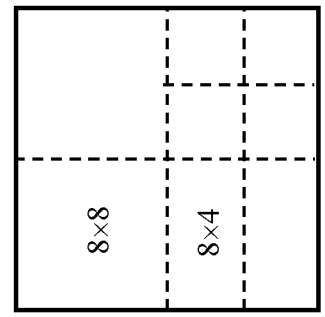
Figure 11:
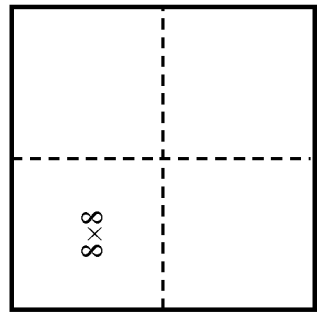
Figure 11:
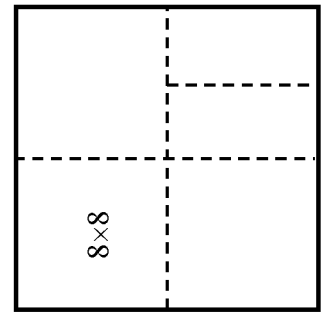

FIG. 10 and FIG. 11 illustrate exemplary image partitioning modes of one of the macroblocks of an image according to the H.264 standard. Table-I below indicates standardized partitions of a macroblock.

Figure 12:
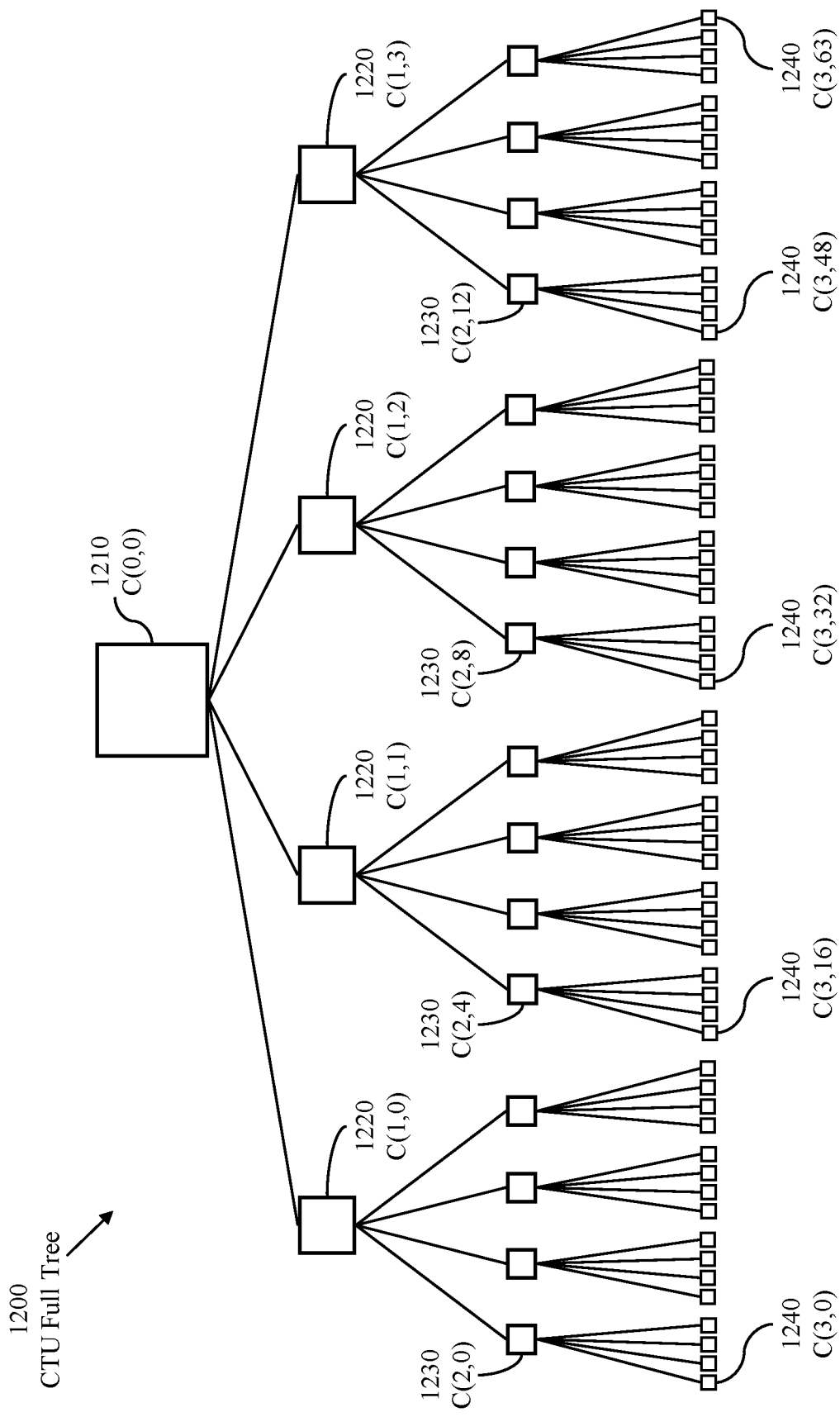
FIG. 12 illustrates a full quadtree representing image partitioning of a Code Tree Unit according to the HEVC standard, for use in an embodiment of the present invention.

FIG. 12 illustrates a full quadtree representing image partitioning of a Code Tree Unit according to the HEVC (H.265) standard where a CTU of size 64×64 may be partitioned into up to 64 code units (CUs) of size 8×8 each. Table-II below indicates standardized partitions of a CTU.

Figure 13:
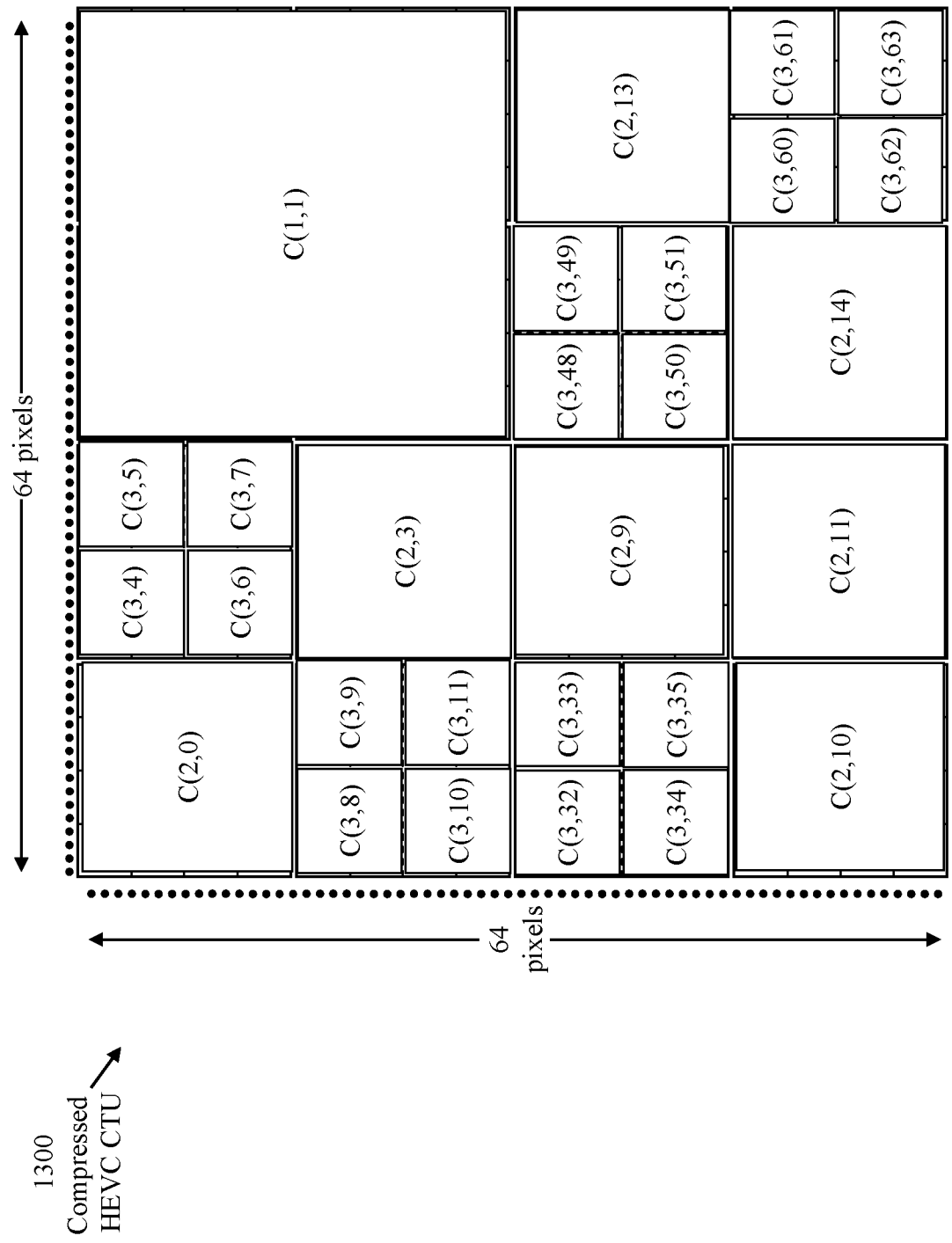
FIG. 13 illustrates an exemplary image partitioning mode of a Code Tree Unit (CTU) according to the HEVC (H.265) standard, for use in an embodiment of the present invention.

FIG. 13 illustrates an exemplary image partitioning mode of a Code Tree Unit (CTU) according to the HEVC (H.265) standard.

Figure 14:
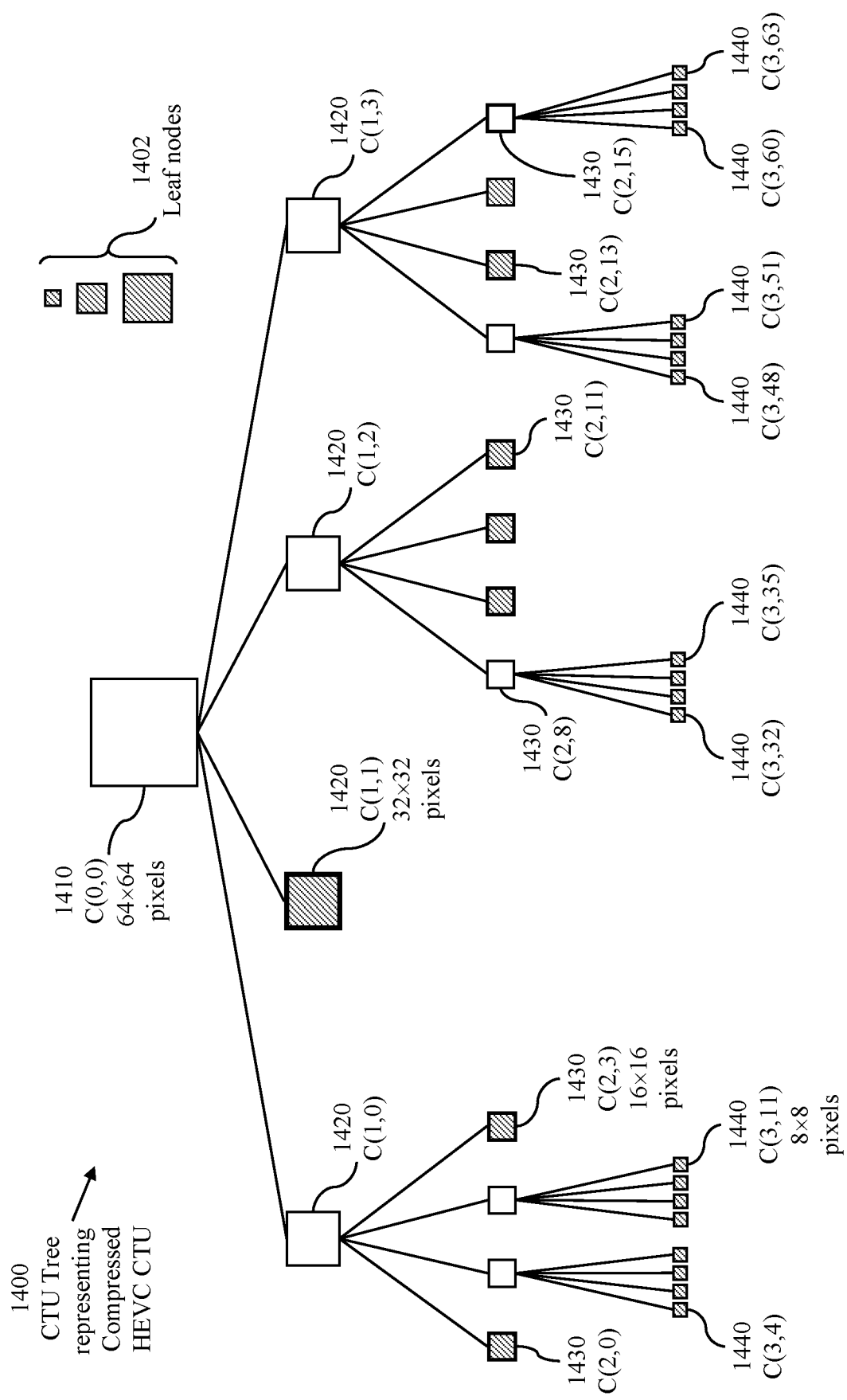
FIG. 14 illustrates a quadtree representation of the CTU of FIG. 13.

FIG. 14 illustrates a quadtree representation of the CTU of FIG. 13. The node depths are indexed as $0 \le d < 4$ ($d=0$ to $d=3$), and the nodes of each depth d are indexed sequentially. The nodes of depth d are individually identified as $C(d, j)$, $0 \le j < 4^d - 1$. For $d=0$, $0 \le j < 4^0 = 1$. For computational simplicity, this indexing discipline applies uniformly whether the quadtree is a full quadtree or a pruned quadtree.

Figure 15:
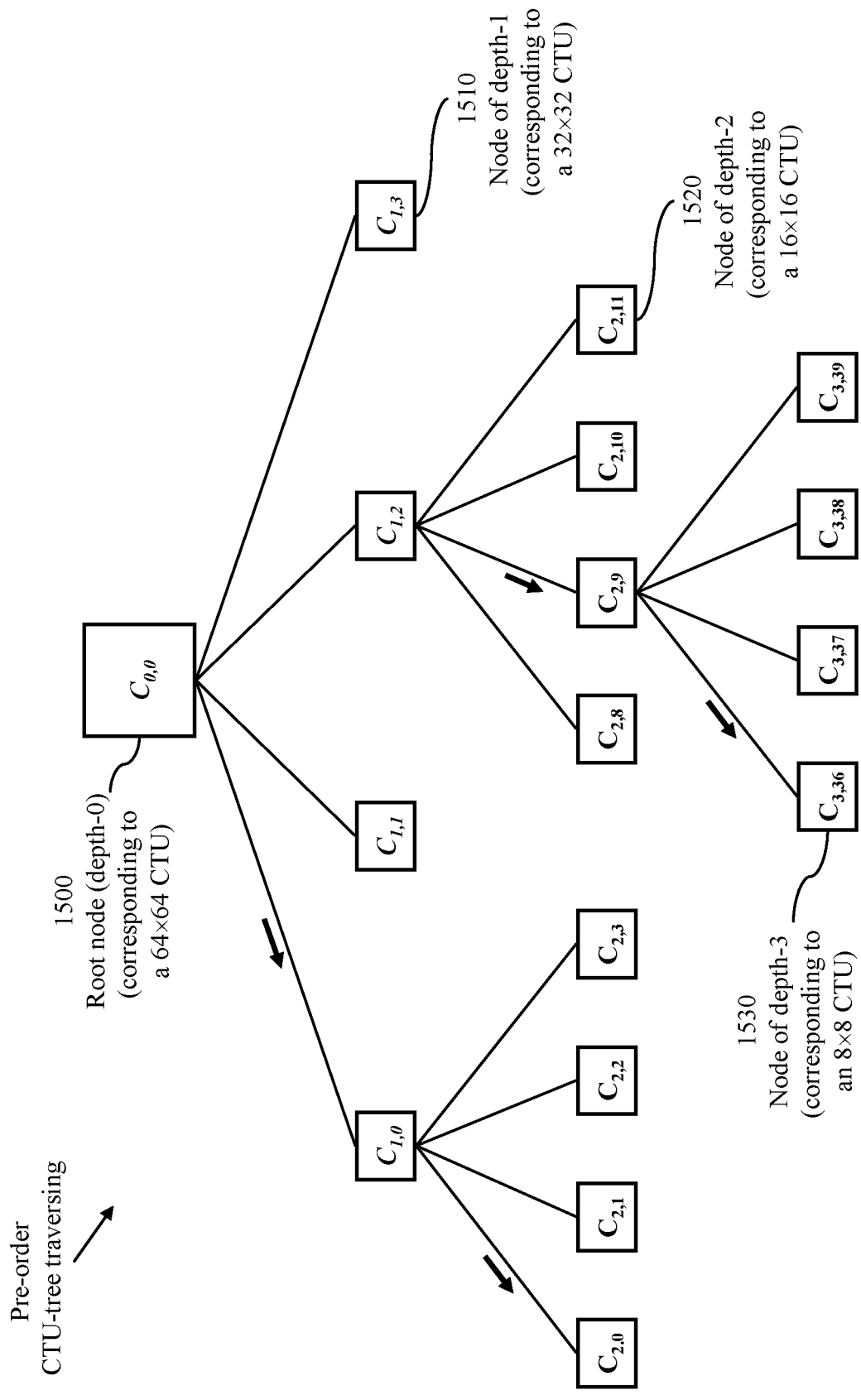
FIG. 15 illustrates pre-order traversal of a quadtree representing a CTU.

FIG. 15 illustrates pre-order traversal of a quadtree representing a CTU.

Figure 16:
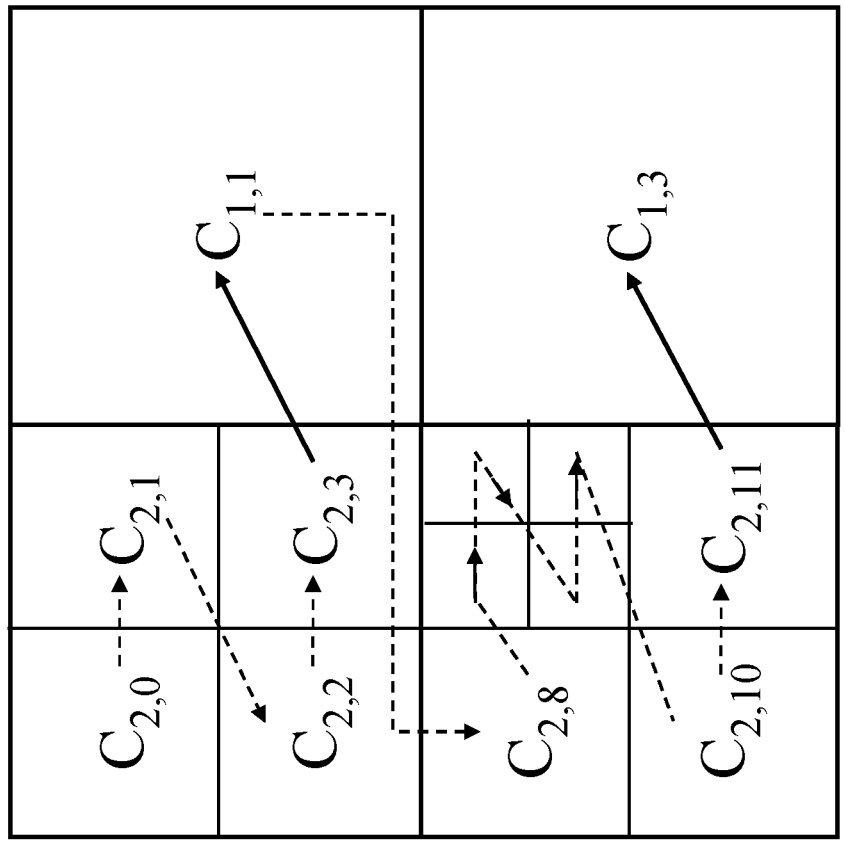
FIG. 16 illustrates image-partitions corresponding to nodes of the quadtree of FIG. 15.

FIG. 16 illustrates image-partitions corresponding to nodes of the quadtree of FIG. 15.

Figure 17:
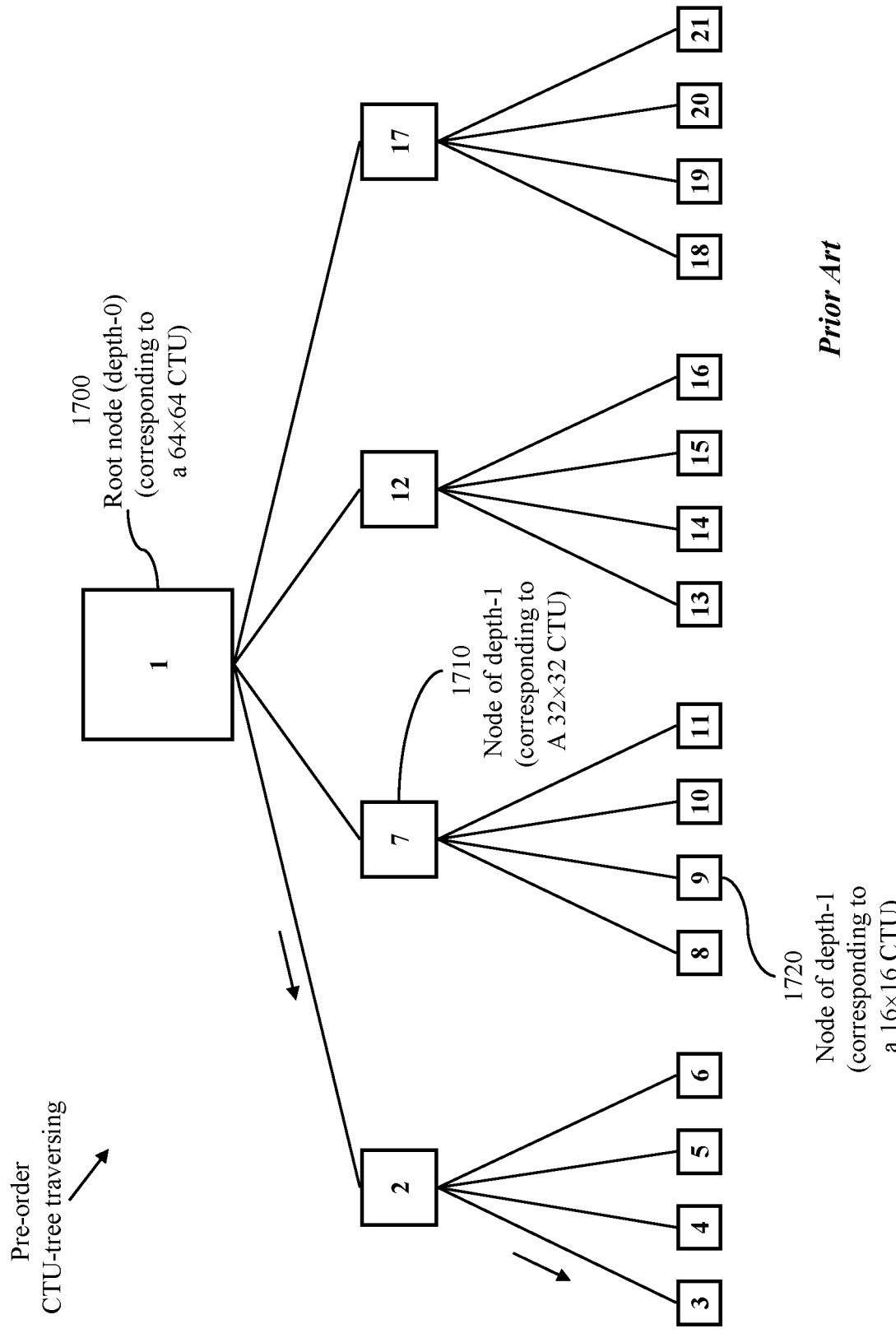
FIG. 17 illustrates node indexing to facilitate pre-order traversing of a full quadtree of a maximum depth of three levels, for use in an embodiment of the present invention.

FIG. 17 illustrates node indexing to facilitate pre-order traversing of a full quadtree of a maximum depth of three levels.

Figure 18:
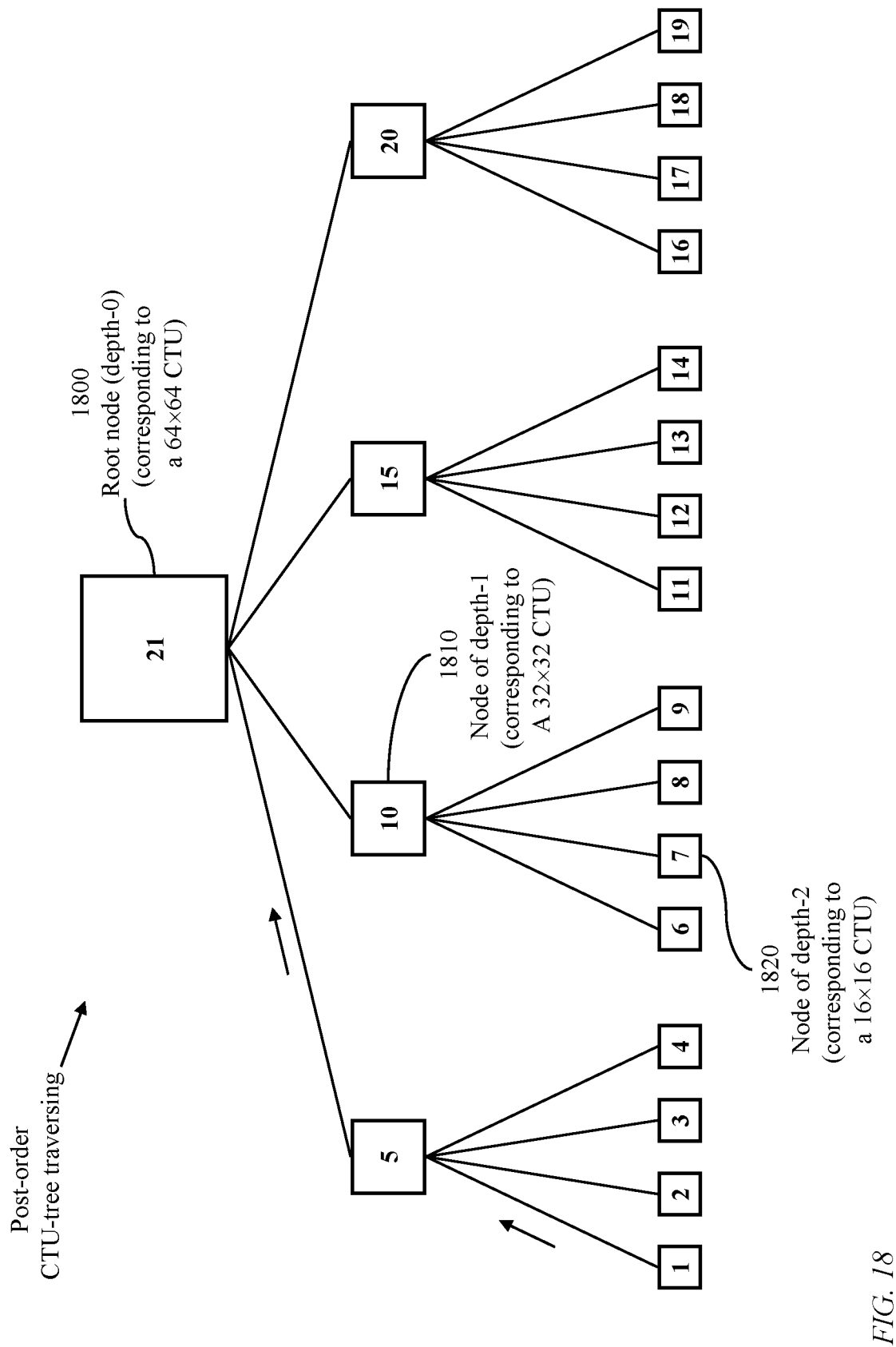
FIG. 18 illustrates node indexing to facilitate post-order traversing of a full quadtree of a maximum depth of three levels, for use in an embodiment of the present invention.

FIG. 18 illustrates node indexing to facilitate post-order traversing of a full quadtree of a maximum depth of three levels.

Figure 19:
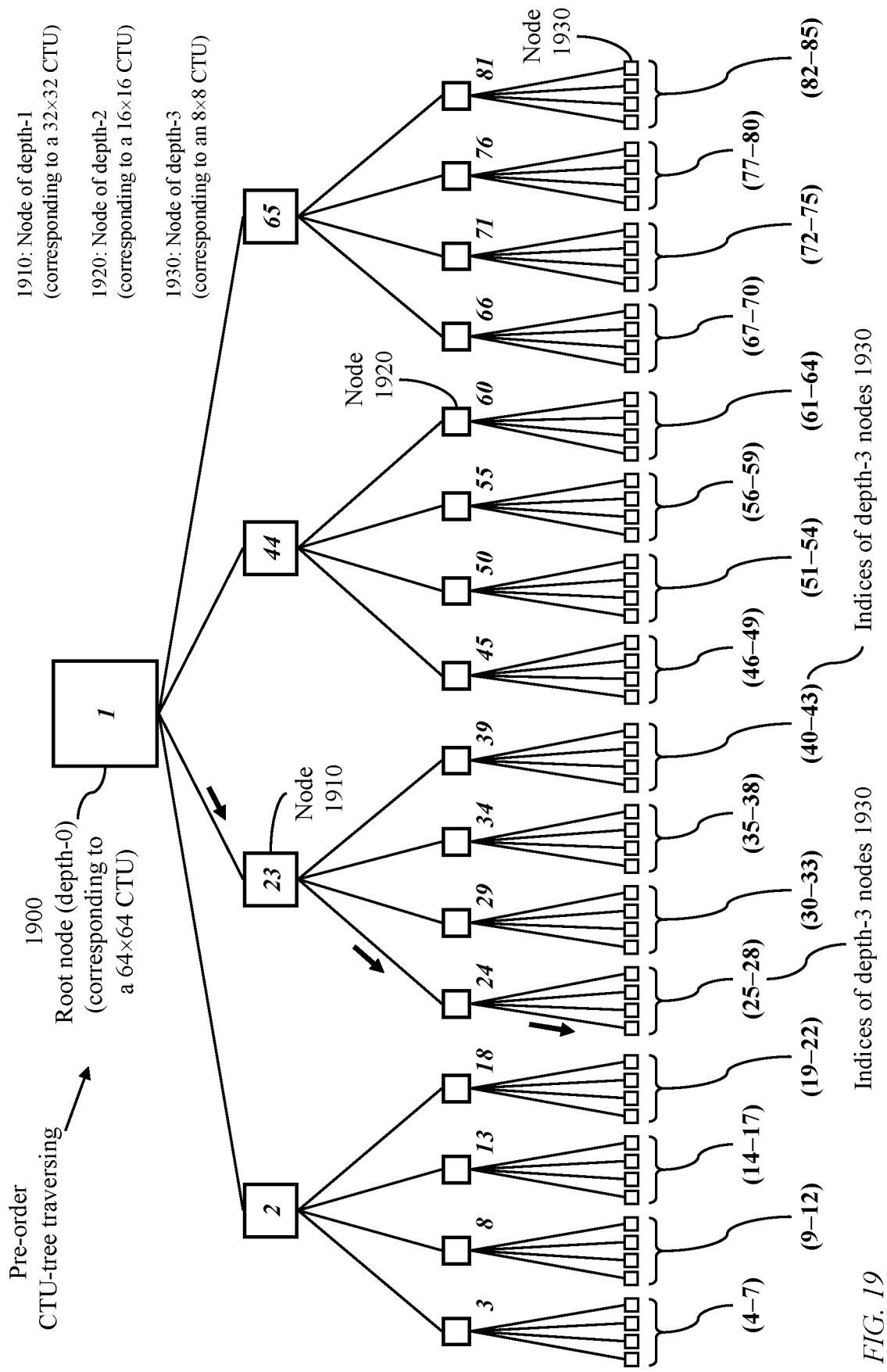
FIG. 19 illustrates node indexing to facilitate pre-order traversing of a full quadtree of a maximum depth of four levels, for use in an embodiment of the present invention.

FIG. 19 illustrates node indexing to facilitate pre-order traversing of a full quadtree of a maximum depth of four levels.

Figure 20:
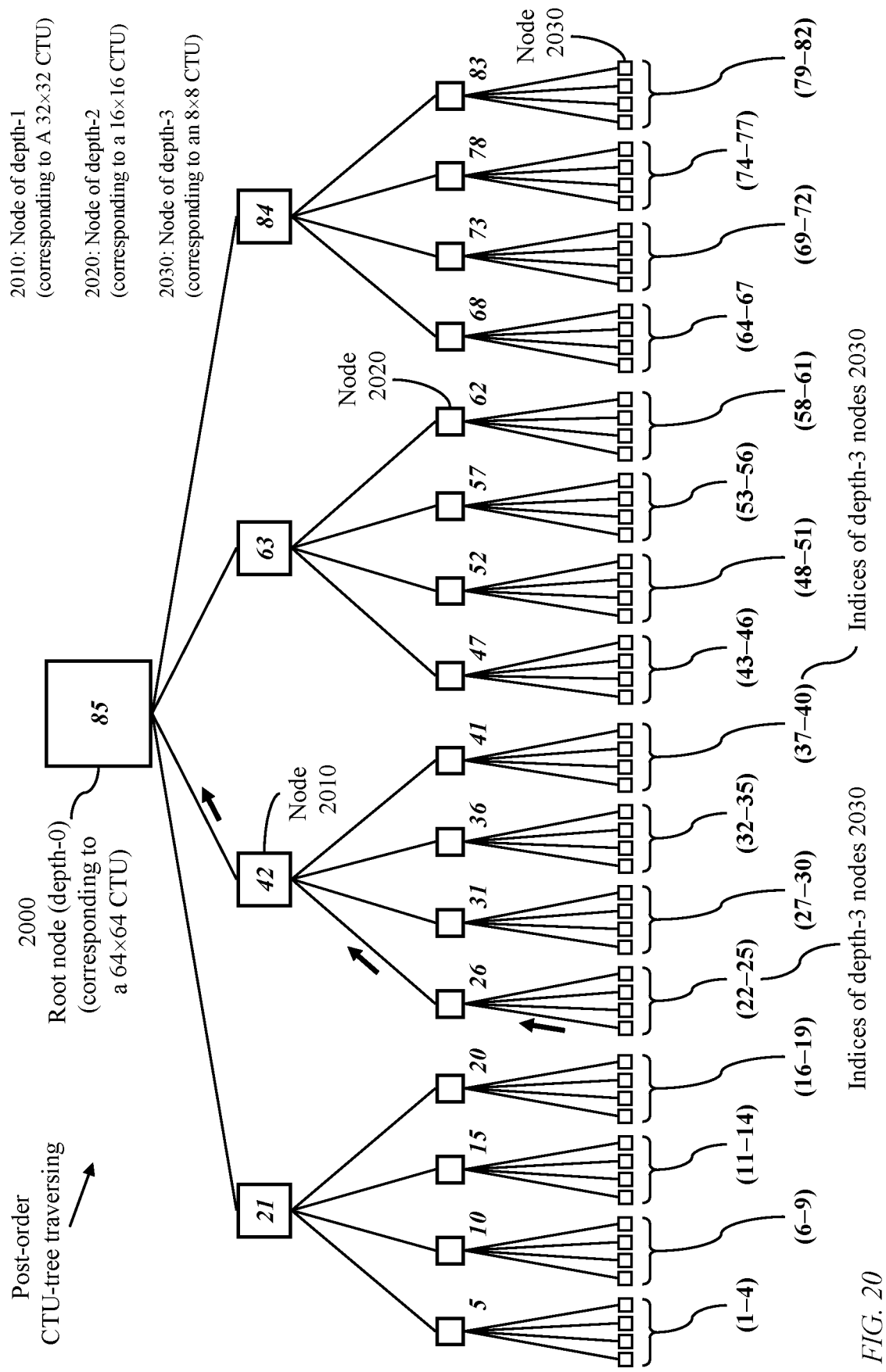
FIG. 20 illustrates node indexing to facilitate post-order traversing of a full quadtree of a maximum depth of four levels, for use in an embodiment of the present invention.

FIG. 20 illustrates node indexing to facilitate post-order traversing of a full quadtree of a maximum depth of four levels.

Figure 21:
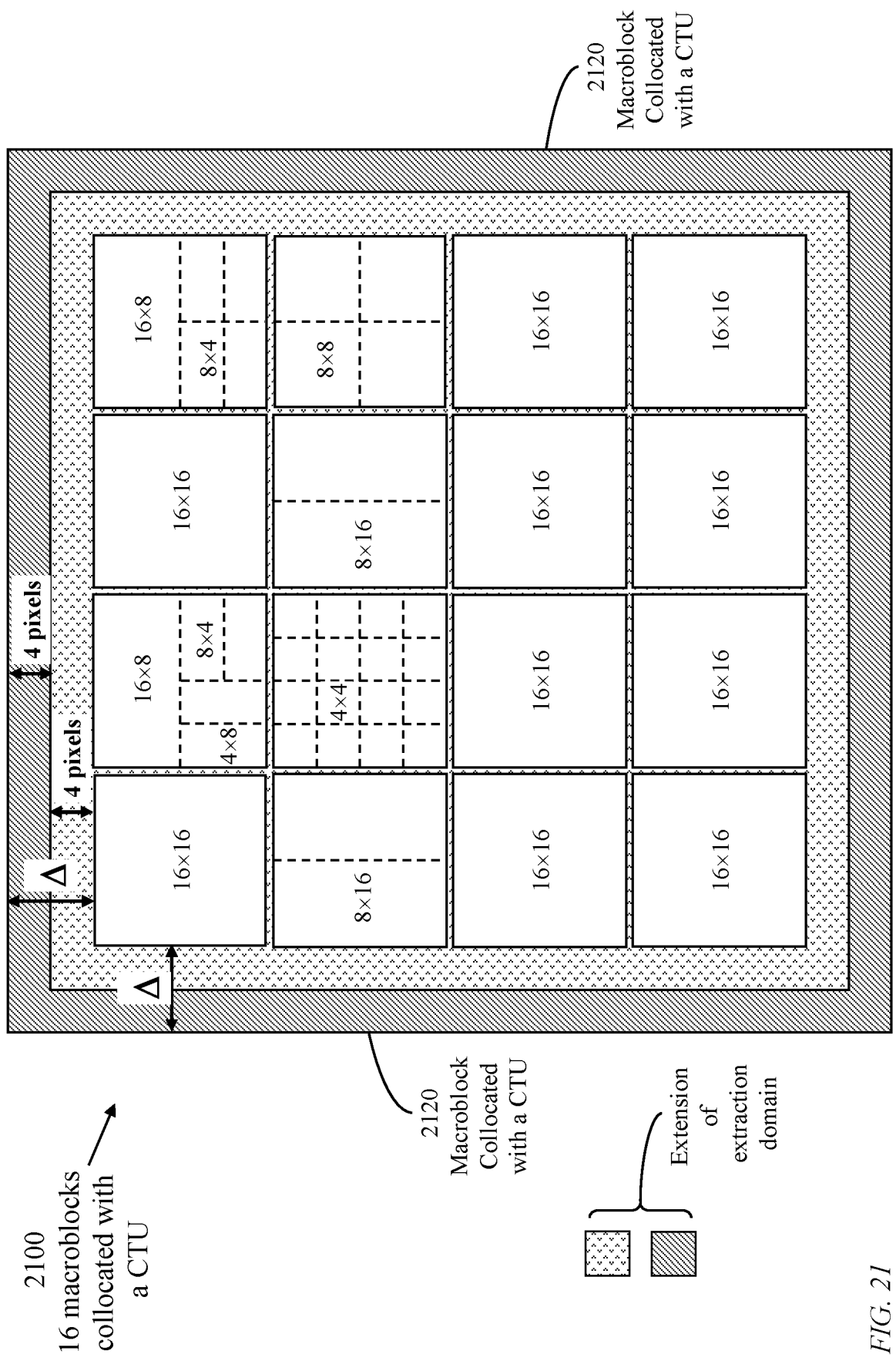
FIG. 21 illustrates an exemplary set of 16 contiguous macroblocks of a reference image encoded according to the H.264 standard, for use in an embodiment of the present invention.

FIG. 21 illustrates an exemplary set of 16 contiguous macroblocks of a reference image encoded according to the H.264 standard. Some macroblocks are segmented into partitions of different dimensions. The 16 contiguous macroblocks form a matrix of four columns and four rows of macroblocks and occupy a region of dimension 64×64 pixels. Both the H.264 compressed bit strings and the reconstructed bit strings representing the 16 contiguous macroblocks are used for synthesizing a portion of an image formulated according to the HEVC standard. The process of extracting motion vectors from the region covering the 16 macroblock may consider extracting the motion vectors from a larger region of dimension $\{(64+2 \times j \times \Delta) \times (64+2 \times j \times \Delta)\}$, where $\Delta=4$ and j is a positive integer, preferably not exceeding a predefined upper bound ($0 \le j \le 2$, for example). The value of j may be user defined.

Figure 22:
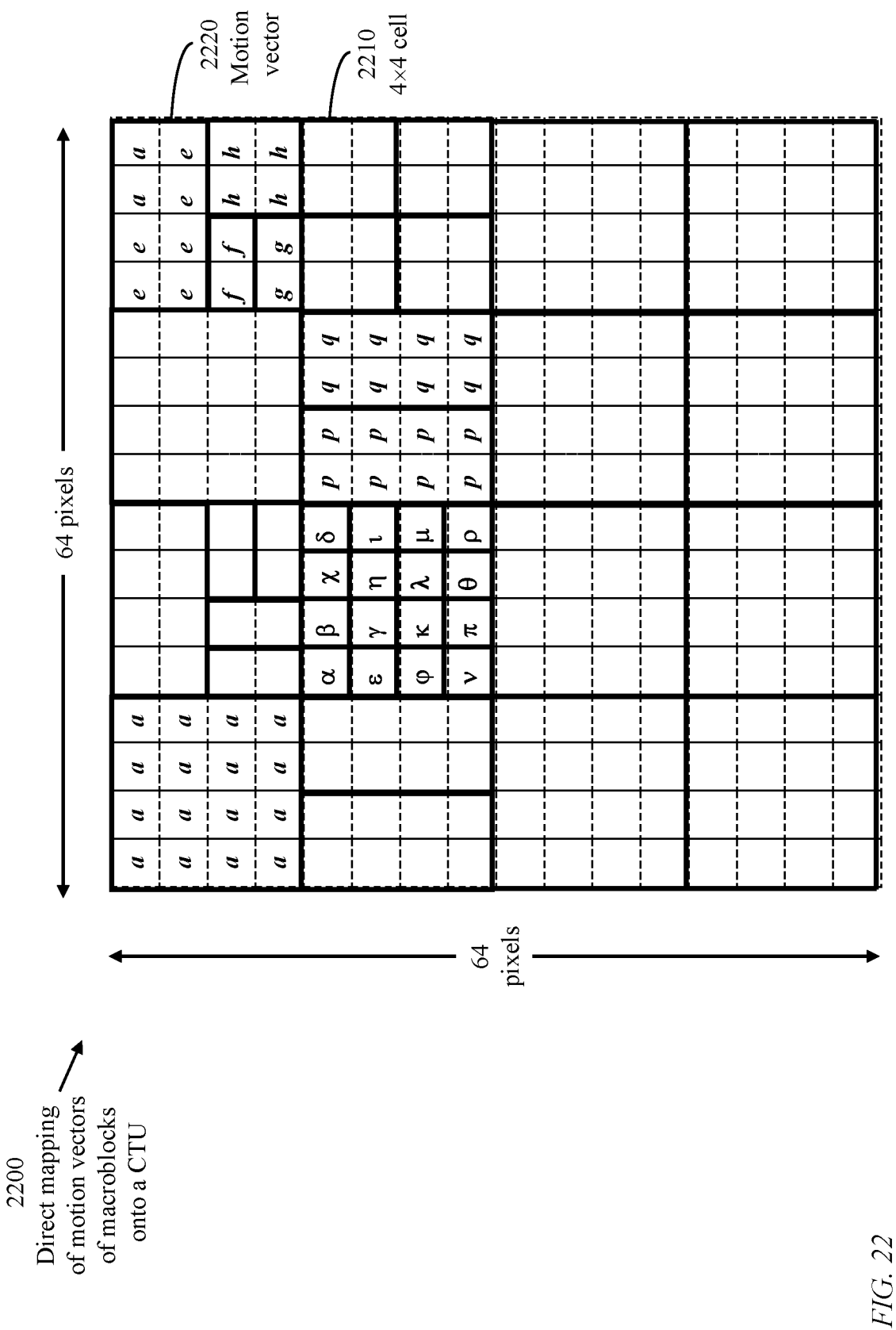
FIG. 22 illustrates the mapping of intermodal motion vectors associated with partitions of the set of 16 contiguous macroblocks onto 4×4 cells within a CTU, in accordance with an embodiment of the present invention.

FIG. 22 illustrates the mapping of intermodal motion vectors associated with partitions of the set of 16 contiguous macroblocks onto 4×4 cells within a CTU. A letter within a 4×4 cell of the synthesized CTU denotes a respective motion vector.

Figure 23:
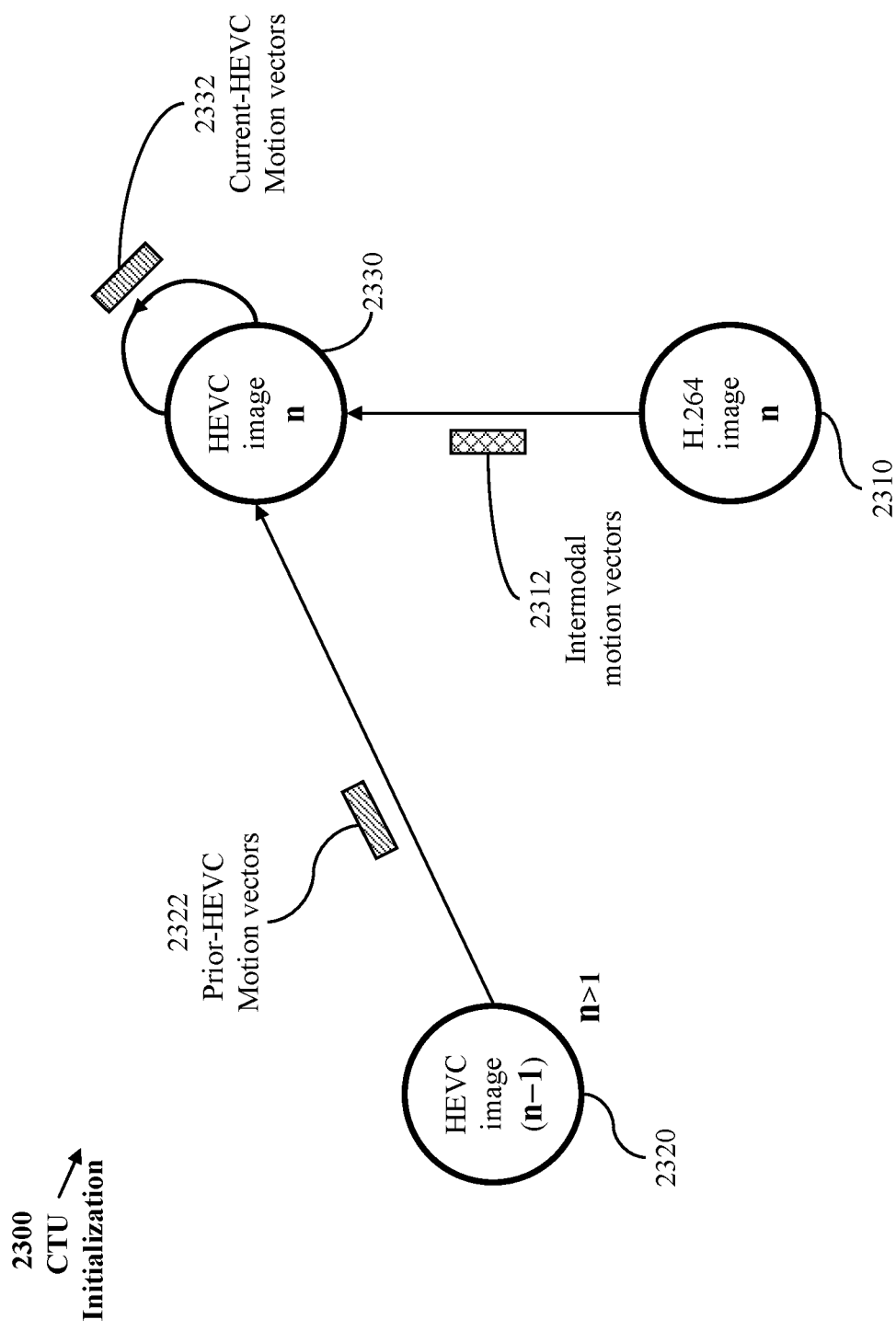
FIG. 23 illustrates a process of extracting candidate motion vectors for a specific CTU, in accordance with an embodiment of the present invention.
Figure 25:
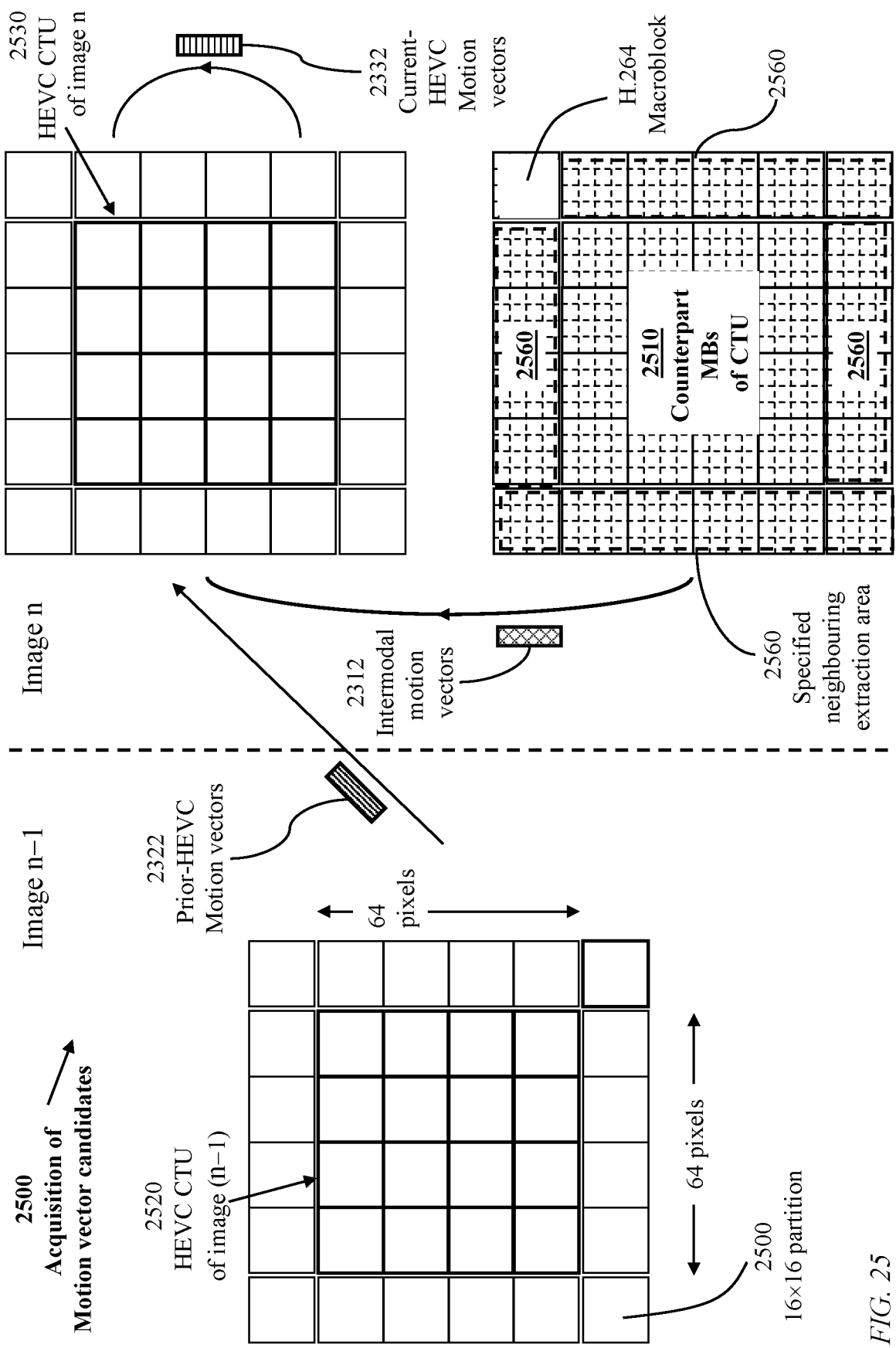
FIG. 25 illustrates acquisition of motion-vector candidates based on a collocated code tree unit and a cluster of synchronous macroblocks, in accordance with an embodiment of the present invention.

FIG. 23 illustrates a process of extracting candidate motion vectors for a specific CTU. The synthesis of current HEVC compressed data 2330, for a CTU of frame n, relies on:
(1) intermodal motion vectors 2312 (and associated data) extracted from H.264 compressed data 2310 of a corresponding frame (FIG. 25);
(2) prior HEVC motion vectors 2322 (and associated data) extracted from prior HEVC compressed data 2320 (FIG. 25); and
(3) motion vectors extracted from synthesised portions of the current HEVC compressed data (FIG. 25 and FIG. 26).

Figure 24:
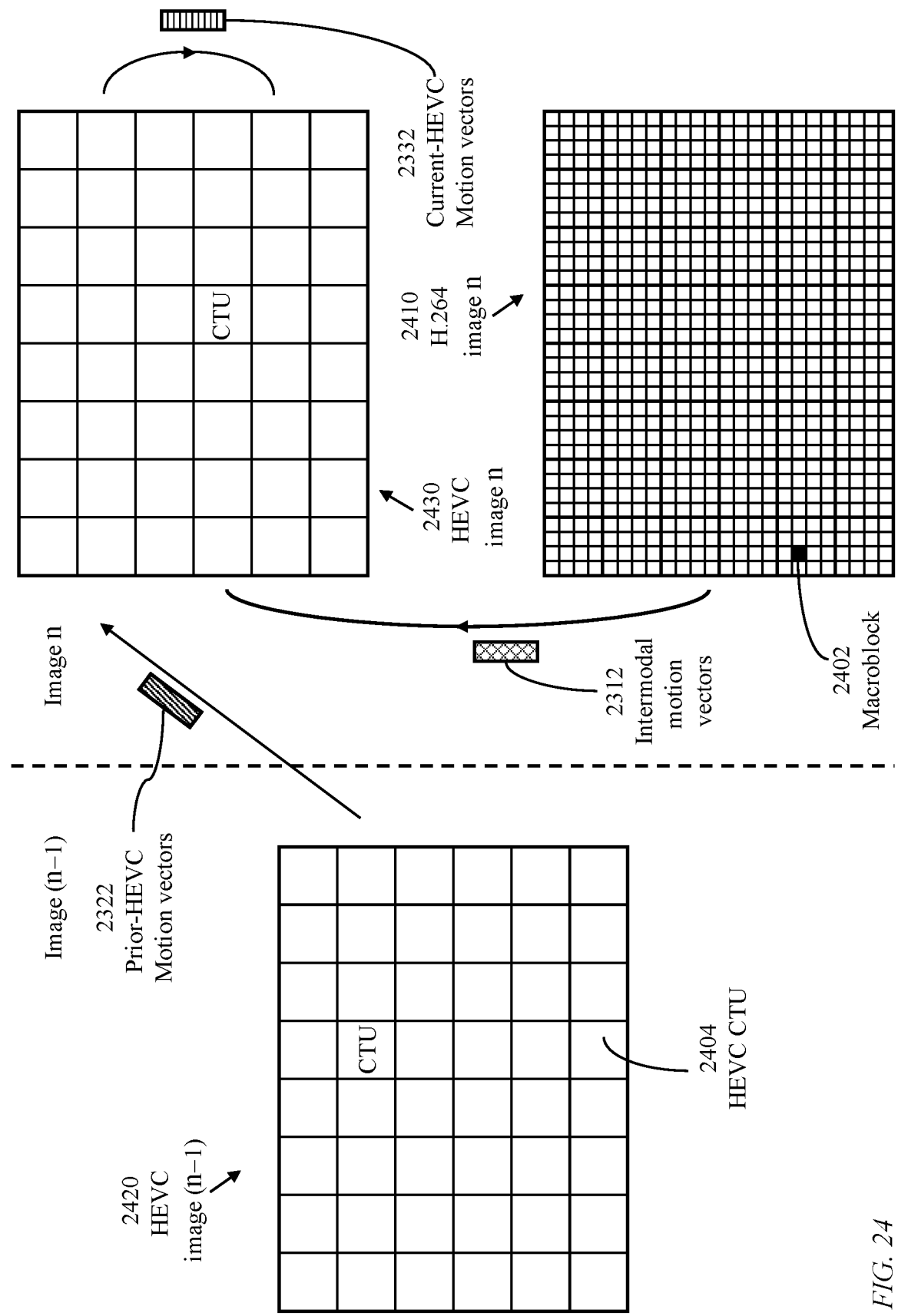
FIG. 24 illustrates synthesis of a current image according the HVEC standard based on content of a synchronous image formatted according to the H.264 standard, a reference image formatted according to the HEVC standard, and already synthesized regions of the current image, in accordance with an embodiment of the present invention.
Figure 26:
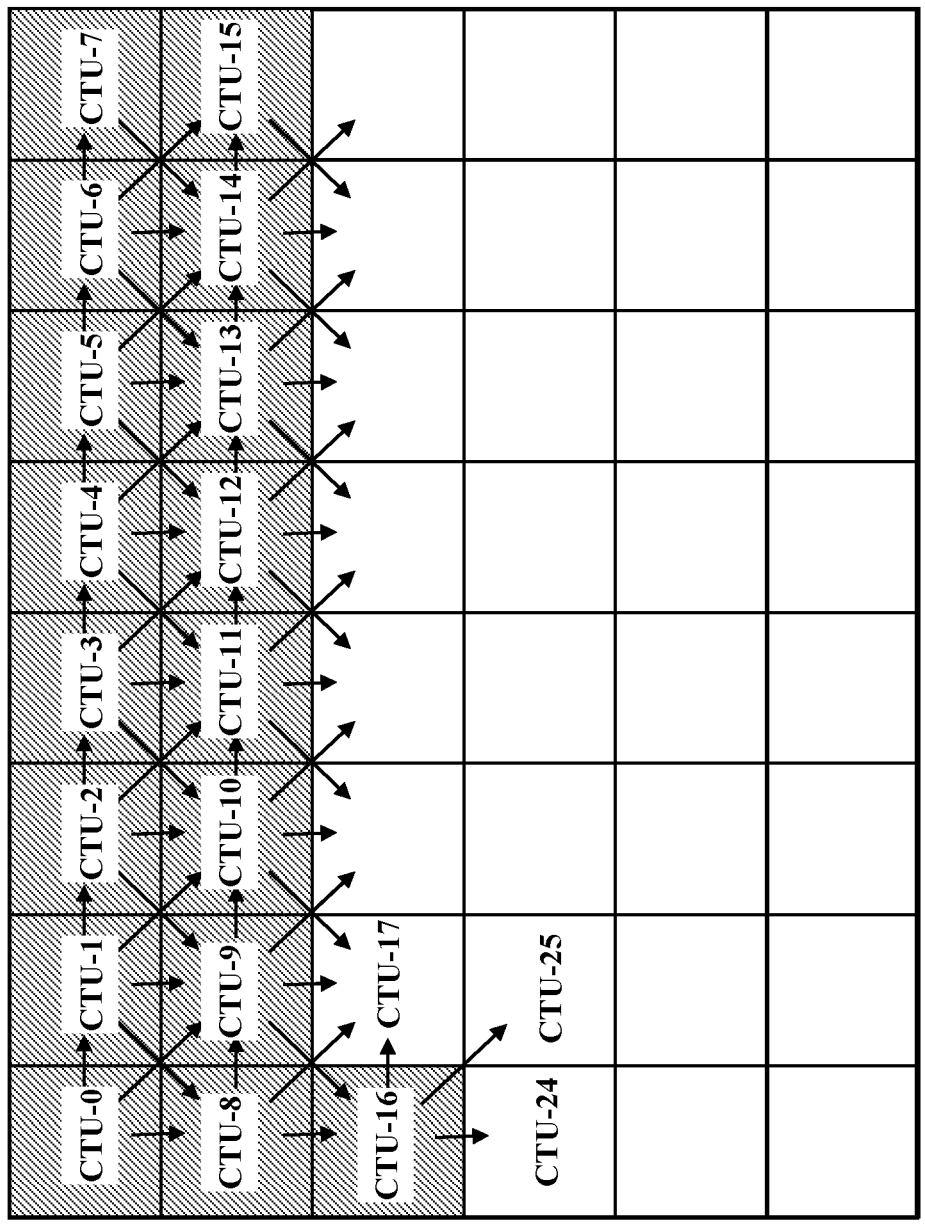
FIG. 26 illustrates gradual synthesis of a current image based on extracting motion vectors from neighbouring fully synthesized regions, within the current image, that satisfy specified proximity conditions, in accordance with an embodiment of the present invention.

FIG. 24, FIG. 25, and FIG. 26 detail the process of FIG. 23. FIG. 24 illustrates a current image of index n, referenced as HEVC image 2430, being synthesized according the HVEC standard based on content of:
a synchronous image (synchronous frame) 2410 formatted according to the H.264 standard;
a reference image 2420 formatted according to the HEVC standard; and
already synthesized regions of the current image 2430 (FIG. 26).

TABLE I

H.264 Macroblock partitioning:

| | Encoding mode | |
| --- | --- | --- |
| | Intra (spatial) | Inter (temporal) |
| Partition size | 16 × 16   4 × 4 | 16 × 16   16 × 8   8 × 16   8 × 8 ↓ 8 × 8   8 × 4   4 × 8   4 × 4 |

TABLE II

HEVC PU Partitions

| | | | CTU size | | | |
| --- | --- | --- | --- | --- | --- | --- |
| | | | 64 × 64 | 32 × 32 | 16 × 16 | 8 × 8 |
| Partition size | Intra (spatial) encoding | 2N × 2N | 64 × 64 | 32 × 32 | 16 × 16 | 8 × 8 |
| | | N × N | 32 × 32 | 16 × 16 | 8 × 8 | 4 × 4 |
| | Inter | 2N × 2N | 64 × 64 | 32 × 32 | 16 × 16 | 8 × 8 |

TABLE II-continued

HEVC PU Partitions

| | | CTU size | | | |
|---|---|---|---|---|---|
| | | 64 × 64 | 32 × 32 | 16 × 16 | 8 × 8 |
| (temporal) encoding | 2N × N | 64 × 32 | 32 × 16 | 16 × 8 | 8 × 4 |
| | N × 2N | 32 × 64 | 16 × 32 | 8 × 16 | 4 × 8 |
| | N × N | 32 × 32 | 16 × 16 | 8 × 8 | x |
| | 2N × nU | 64 × 16U | 32 × 8U | 16 × 4U* | x |
| | 2N × nD | 64 × 16D | 32 × 8D | 16 × 4D* | x |
| | nL × 2N | 16L × 64 | 8L × 32 | 4L × 16* | x |
| | nR × 2N | 16R × 64 | 8R × 32 | 4R × 16* | x |

*n = 4 (for example)

The synchronous image belongs to the reconstructed bitstream 924 produced at the augmented H.264 decoder of the intermodal transcoder of FIG. 9. The reference image 2420 is an HEVC image preceding the current HEVC image 2430. Image 2410 is spatially organized as contiguous macroblocks 2402. Images 2420 and 2430 are organized as contiguous Coding Tree Units (CTUs) 2404. The process of synthesizing image 2430 relies on intermodal motion vectors 2312, prior HEVC motion vectors 2322, and current HEVC motion vectors 2332 extracted from already synthesized regions of the current image 2430.

FIG. 25 illustrates a CTU 2530 of the image 2430, a collocated CTU 2520 of image 2420, and a cluster 2510 of macroblocks of image 2410. CTUE 2520 and CTU 2530 are collocated. CTU 2530 and cluster 2510 are synchronous and collocated. Extraction of inter-modal motion vectors may extend to a neighbouring area 2560 surrounding the cluster 2510.

FIG. 26 illustrates gradual synthesis of image 2430 of index n. CTU-0 may be synthesized based on content of a collocated synchronous cluster 2510 and a collocated CTU 2520 of image (n−1), if any (i.e., if image n is not the first of a succession of images under consideration).

Each HEVC image is logically partitioned into contiguous image regions (CTUs) of 64×64 pixels each. Already fully synthesized image regions of a current HEVC image are marked in FIG. 26.

An image region (a CTU) under consideration may extract motion vectors from a fully synthesized image region, of a current image, which satisfies a specified proximity to the image region under consideration.

The proximity is preferably user defined and expressed as a chessboard distance. A predefined proximity is preferably a chessboard distance of 1.

CTU-1 may be synthesized based on content of a collocated synchronous cluster 2510 and a collocated CTU 2520 of image (n−1), if any, in addition to content of CTU-0. The chessboard distance between CTU-1 and CTU-0 is 1.

CTU-8 may be synthesized based on content of a collocated synchronous cluster 2510 and a collocated CTU 2520 of image (n−1), if any, in addition to content of CTU-0 and CTU-1. The chessboard distance between CTU-8 and each of CTU-0 and CTU-1 is 1.

CTU-12 may be synthesized based on content of a collocated synchronous cluster 2510 and a collocated CTU 2520 of image (n−1), if any, in addition to content of CTU-3, CTU-4, CTU-5, and CTU-11. The chessboard distance between CTU-12 and each of CTU-3, CTU-4, CTU-5, and CTU-11 is 1.

CTU-17 may be synthesized based on content of a collocated synchronous cluster 2510 and a collocated CTU 2520 of image (n−1), if any, in addition to content of CTU-8, CTU-9, CTU-10, and CTU-16.

CTU-25 may be synthesized based on content of a collocated synchronous cluster 2510 and a collocated CTU 2520 of image (n−1), if any, in addition to content of CTU-16, CTU-17, CTU-18, and CTU-24.

The current HEVC motion vectors are extracted taking into account these dependencies. For instance, for CTU-17, the current HEVC motion vectors are those extracted from the boundaries of CTU-16, CTU-8, CTU-9 and CTU-10 (their final encoded motion vectors).

Figure 27:
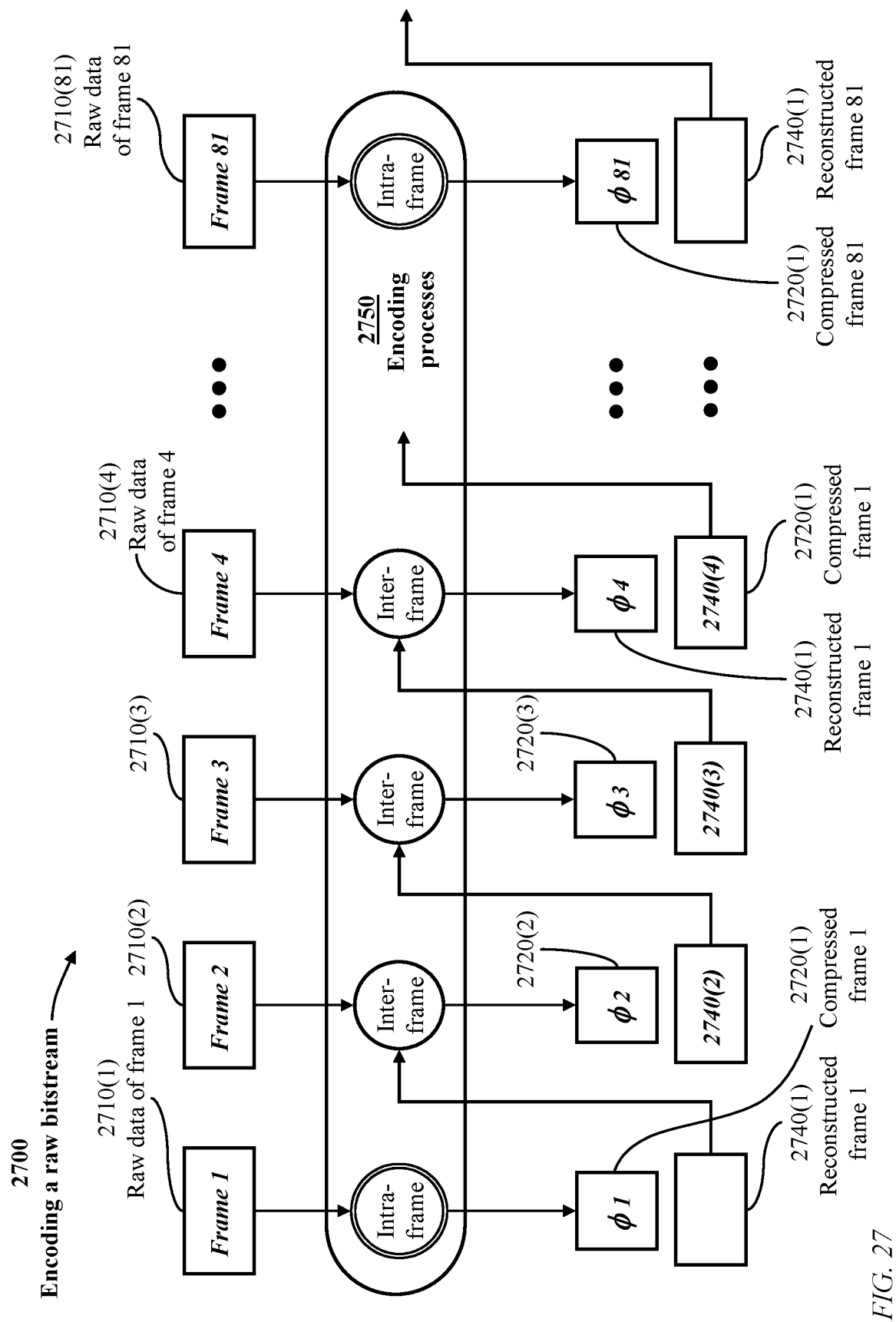
FIG. 27 illustrates encoding a video signal according to a specific compression mode.

FIG. 27 illustrates encoding a raw bitstream formatted according to a specific compression mode. The time domain is organized into time frames and bits of the raw bitstream within a time frame represent an image. The time frames, and corresponding images, are indexed sequentially starting with raw frame-1 (image-1). Starting with frame-1, the encoder (110, FIG. 1) produces a compressed frame-1, denoted φ1, based on intra prediction parameters. The encoder further produces a reconstructed frame, referenced as 2740(1), corresponding to φ1 to be used for encoding raw frame-2. The encoder produces compressed frame-1, denoted φ2 in addition to a reconstructed frame 2740(2) to be used for encoding raw frame-3, and so on.

Figure 28:
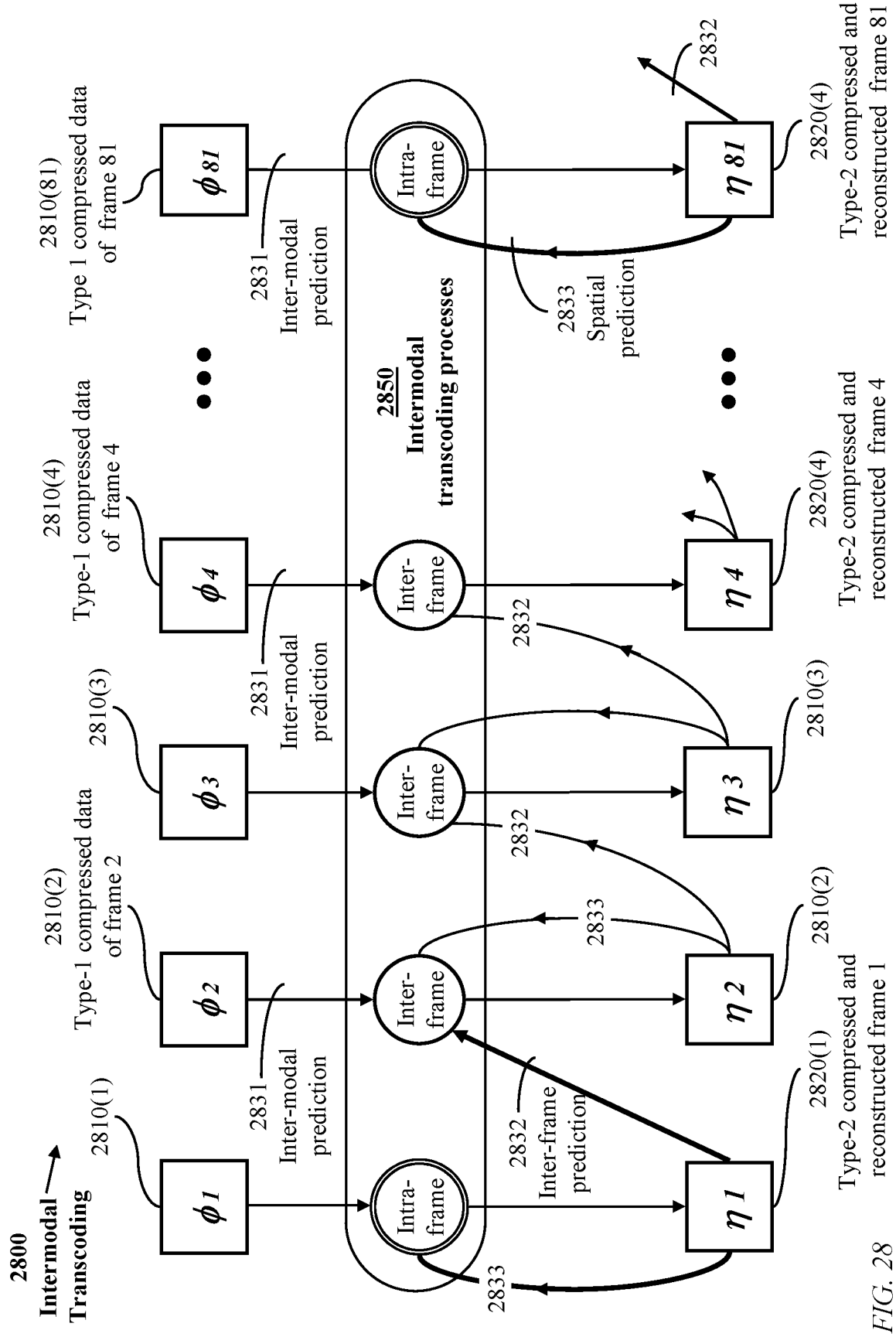
FIG. 28 illustrates converting a bitstream received from a type-1 encoder to a bitstream compatible with a type-2 compression mode, in accordance with an embodiment of the present invention.

FIG. 28 illustrates intermodal transcoding of a compressed bitstream generated according a first compression scheme, such as the scheme of the H.264 standard, to another compressed bitstream obeying a second compression scheme, such as the scheme of the HEVC standard. The intermodal transcoder (FIGS. 7 to 9) receives data representing a succession of compressed images (compressed frames) denoted {φ1, φ2, . . . φ81 . . . }. The compressed images are generated according the first scheme and referenced as type-1 images (type-1 frames) 2810. The intermodal transcoder synthesizes images (frames) denoted {η1, η2, . . . η81 . . . } adhering to the second compression scheme. The synthesis of each image entails generating a compressed image in addition to a reconstructed image based on the compressed image.

Starting with the first image, the intermodal transcoder generates a compressed image and a reconstructed image, together denoted η1, based on φ1 (inter-modal prediction 2831) and already synthesised CTUs of the image (spatial prediction parameters 2833). The intermodal transcoder generates η2 (a compressed image and a reconstructed image) based on: φ2 (inter-modal prediction 2831); η1 (inter prediction 2832) and already synthesised CTUs of the image (spatial prediction parameters 2833), and so on.

Figure 29:
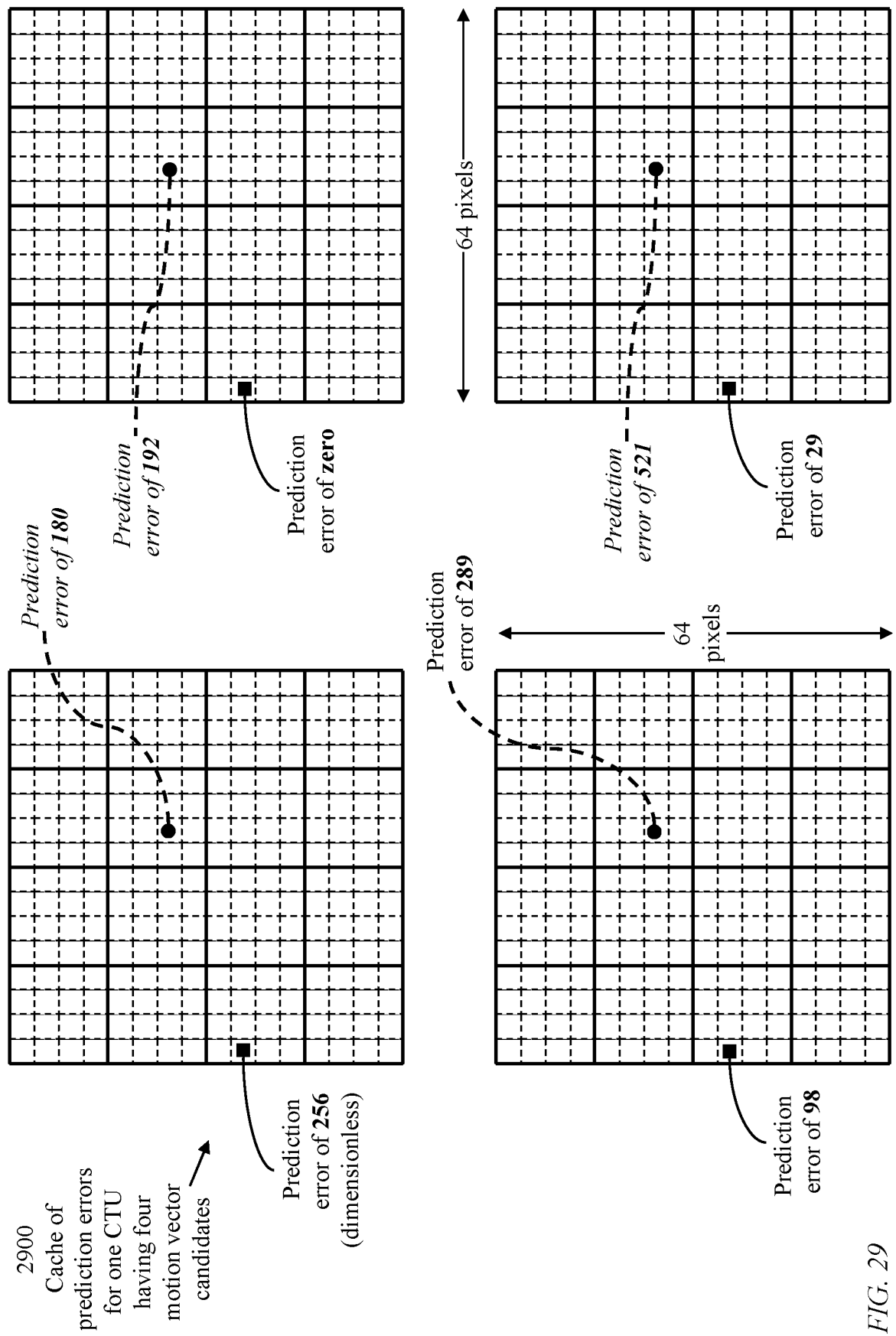
FIG. 29 illustrates matrices of prediction errors for each cell of a CTU, in accordance with an embodiment of the present invention.

FIG. 29 illustrates matrices of prediction errors for each cell of a CTU. Each matrix corresponds to one of four motion vectors extracted for the CTU. Each of the illustrated matrices corresponds to a CTU of size 64×64 pixels of a current HEVC image and each cell is of size 4×4 pixels yielding 256 cells per CTU. Each of the illustrated matrices is associated with a motion vector extracted either from the synchronous H.264 image, a reference (previous) HEVC image, or a partly synthesized current HEVC image. Each cell of a matrix contains the prediction error between data synthesized from a synchronous H.264 image (i.e. the current image to transcode) and a reference (previous) HEVC image for the associated motion vector. The prediction error of a cell is based on deviation of synthesized cell data from the reconstructed bitstream 724, 824, or 924 (corresponding to the synchronous H.264 image) produced by a respective augmented encoder. As illustrated, a first cell (square symbol) has prediction errors of 256, zero, 98, and 29 in the four matrices corresponding to the four motion vectors. The prediction error is dimensionless. A second cell (circular symbol) has prediction errors of 180, 192, 289, and 521 in the four matrices corresponding to the four motion vectors. To determine the best motion vector for a specific segment of the CTU overlaying an integer number of cells, the total prediction error of the specific segment is determined and the motion vector yielding the least total prediction error is selected. The specified segment is a partition of the CTU defined according to the HEVC standard.

Figure 30:
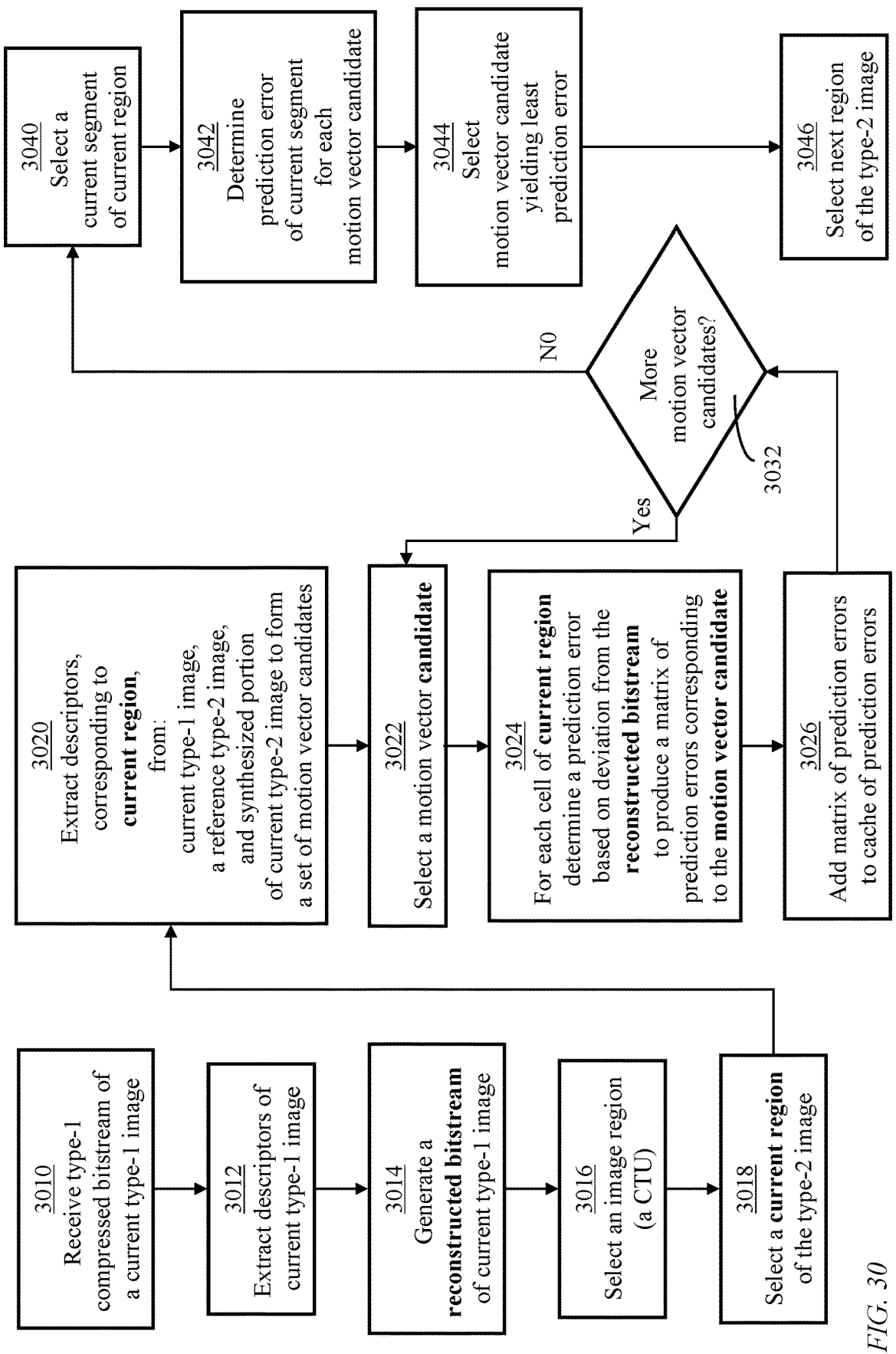
FIG. 30 illustrates processes of intermodal transcoding, in accordance with an embodiment of the present invention.

FIG. 30 illustrates processes of intermodal transcoding in accordance with the present invention. An augmented type-1 decoder 720 receives a type-1 compressed bitstream of a current type-1 image (process 3010) and extracts corresponding descriptors (process 3012). A descriptor includes data defining a partitioning mode, prediction mode (motion vector), and corresponding residual information. The augmented decoder also produces a reconstructed bitstream of the current type-1 image (process 3014) for use in the transcoder kernel 750. Each image is logically partitioned into contiguous image regions, which are the CTUs of the HEVC standard. The transcoder kernel 750 consecutively selects each image region (process 3016) and for each image region (each CTU) selects a current segment overlaying an integer number of cells (process 3018). The transcoder kernel 750 extracts descriptors corresponding to the current segment (process 3020) from a current type-1 image, a previous type-2 image (if any), and the synthesized part (if any) of the current type-2 image under construction. The extracted descriptors serve as a set of candidate descriptors. In particular, the extracted motion vectors serve as a set of motion vector candidates. As defined earlier, each descriptor defines a partitioning mode, prediction mode (e.g., motion vector), and corresponding residual information (which may be null data). The transcoder kernel selects a motion vector candidate (process 3022) according to any prescribed order, and for each (4×4) cell of the current image region (current CTU) under consideration determines (process 3024) a prediction error based on deviation from the reconstructed bitstream of process 3014 and the HEVC reference frame portion referred by the motion vector. When all cells of the current image region (current CTU) are considered, a 16×16 matrix of cell prediction errors corresponding to the current motion vector candidate is produced and included in a cache of prediction errors for the current region (process 3026). The transcoder kernel examines the set of motion vector candidates of process 3020 and revisits process 3022 if at least one candidate descriptor has not been considered (process 3032). Ultimately, if K motion vectors are in the set of motion vector candidates, K such 16×16 matrices of cell prediction errors are cached. When all candidate descriptors have been considered, the transcoder kernel selects all designated segments of the current image region, i.e., all designated sub-partitions of the current CTU, (process 3040) and for a current selected segment determines the prediction error corresponding to each motion vector of the set of motion vector candidate (process 3042). The transcoder kernel selects the candidate motion vector yielding the least prediction error (process 3044) to be the preferred motion vector of the current segment (current sub-partition of the current CTU). The processing continues (process 3046) until all image regions and all segments of all image regions are considered and hence the process of synthesizing a type-2 compressed image is complete except for revising the residual information of the synthesized descriptors to be based on deviations from an uncompressed type-2 image. The combinations of preferred motion vectors and sub-partitions for the whole CTU constitute the preferred descriptors for that CTU. To simplify the description, this paragraph focussed on the inter coding but a person skilled in the art of video coding will know how to incorporate intra coding in the process.

The following provides the rationale behind the intermodal transcoder described above with reference to FIGS. 1 to 28.

Motion Propagation Process

The rationale behind the motion propagation process is that H.264 contains motion information which is sufficiently accurate to be reused in HEVC without further refinement. However, motion fields of an H.264 frame and the corresponding HEVC frame are different in terms of density and motion vectors. Although the best MV for a currently processed region in HEVC is generally located in the corresponding region in H.264, a better MV may be found in the neighborhood of this region or in a set of previously encoded HEVC MVs.

The proposed algorithm creates a set of MV candidates during a CTU initialization. The set includes H.264 and HEVC MVs that have a high probability of being propagated in the CTU. Thereafter, during the mode decision process, the motion-propagation process selects, for each AMVP PU, the best MV candidate. Since all PUs evaluate the same MV candidates list, the prediction error of each candidate is pre-computed during the CTU initialization on a 4×4 block basis to eliminate computational redundancy.

Motion Vector Candidate Set Generation

In the proposed method, an MV candidates list is generated. This list includes H.264 and HEVC MVs extracted from a synchronous H.264 frame (the intermodal motion vectors), the preceding HEVC frame (the prior motion vectors), and the regions already processed in the CTU neighborhood (current motion vectors). Since a typical succession of video images contains several static regions, the null MV, denoted $MV_{(0,\ 0)}$, is also added to the list. All duplicate MVs are removed from the list and the number of candidates is denoted K.

Elimination of Redundant Motion Estimation Computation

The complex partitioning structure of a CTU can cause a significant motion-estimation computational redundancy. As the motion data of HEVC can be represented on a 4×4 block basis, up to 24 overlapping AMVP modes can cover the same 4×4 block (3 symmetric modes by depth for the depths 0 to 3; 4 asymmetric modes by depth for the depths 0 to 2). This number increases to 28 if the merge modes are also considered. Hence, the prediction error (SATD) for a given MV can be computed up to 28 times for the same 4×4 block. The exact amount of redundancy depends on different factors like the motion activity in the CTU, the AMVP modes evaluated by the mode decision process, and the motion estimation approach employed (motion search, motion refinement or motion propagation).

When a motion search or a motion refinement algorithm is employed, the computational redundancy is difficult to eliminate because the MVs to evaluate are generally determined at the PU level and can vary from a PU to another in the same CTU.

Since the MV candidates are fixed for the whole CTU, the motion propagation approach removes redundancy at the CTU level by pre-computing the prediction errors (SATD) on a 4×4 block basis for each MV candidate. At the PU level, the prediction errors (SATD) of each 4×4 block covering a region are summed up to get the total prediction error (SATD) for a candidate.

It is important to note that the proposed motion propagation approach for motion estimation is drastically different than the usual approach which consists in establishing and evaluating a list of motion vectors for each partition that needs to be considered. These motion vectors are first evaluated at integer pel precision and then refined at fractional pel precision. In contrast, we establish a list of candidate motion vectors at fractional pel precision for the whole CTU beforehand and evaluate only the prediction based on these motion vectors. Since we evaluate the prediction error for every 4×4 for every motion vector in the list, it allows us to save and reuse the prediction error of those 4×4 blocks to obtain the prediction error of larger partition sizes at a dramatically reduced computational cost. Of course, the method would work if we consider motion vectors at integer pel precision but it would require a motion vector refinement phase at fractional pel precision afterwards to improve the quality. The size of 4×4 for the base blocks was selected as the largest block size that permits the reuse of the prediction error for all the possible partition sizes of the output format. For instance, in HEVC, since the smallest partition size is 8×4 or 4×8, we need to store the prediction errors on 4×4 base blocks to be able to combine the prediction error of base blocks to generate the prediction error for these 8×4 or 4×8 blocks. Smaller base block sizes would lead to more storage and computations and therefore would be inefficient.

For the kth MV candidate, the complete pre-computing process is divided into two steps. The first step interpolates the predicted CTU region, usually on a 64×64 region, since the MV has a quarter-pel precision. The second step computes the prediction error for each 4×4 blocks covering the CTU region. For a 4×4 block located at position (4x,4y) relative to the CTU upper left corner, the prediction error function is defined as:

$$E_{4\times 4}(x,y,k)=SATD(B_{x,y,k})|_{luma}+SATD(B_{x,y,k})|_{Cb}+SATD(B_{x,y,k})|_{Cr},$$

where $(B_{x,y,k})|luma$ denotes the difference between the predicted and the current 4×4 luma blocks at position (4x, 4y) for the kth MV candidate, with x, y∈Z≥0, $(B_{x,y,k})|_{Cb}$ and $(B_{x,y,k})|_{Cr}$ denoting the difference for corresponding 4×4 chroma blocks.

Unlike the original HM model, the chroma blocks are considered in the above prediction error function (in addition to the luma block) to improve the prediction accuracy.

At the PU level, the prediction errors of the 4×4 blocks covering the PU partition region are summed up to get the total prediction error. Hence, for a given PU of 4M×4N samples located at position (4x, 4y) relative to the CTU upper left corner, the prediction error of the kth MV candidate is computed as a double summation of $E_{4\times 4}(i,j,k)$ over x≤j<(x+M) and y≤j<(y+N).

Fast Mode Decision Process

A post-order traversal of the CTU structure significantly reduces the complexity of the mode decision process. This traversal changes the CU splitting problem to a sub-CUs aggregation problem. Hence, the mode decision process must decide if the current best combination of sub-CUs (nodes 1, 2, 3 and 4 in FIG. 18) must be aggregated to determine if the parent CU (node 5) can reduce the R-D cost. This is a simpler problem for two reasons. Firstly, the current best mode is in competition with only one mode at a time (a PU of the parent CU). Secondly, only modes of the same size are compared, since the R-D costs of sub-CUs (nodes 1, 2, 3 and 4) can be combined in one R-D cost to be compared with the parent CU (node 5).

The method comprises steps of:
(1) Recursively processing all the descendants of the current CU;
(2) processing the PU modes of a current CU; and
(3) determining if the current CU must be tentatively split;

Processing the current CU produces a set of PU modes to be evaluated. A PU mode is evaluated in two steps. The first step computes a low-complexity cost function, denoted JPM. If the candidate mode meets specified criteria, the second step evaluates a high-complexity R-D cost function JRD.

Coding-Unit-Splitting Decision

Two alternative methods of deciding whether to tentatively split a coding unit may be applied. The first is a structural split decision (SSD) method. The second is a motion-based split decision (MSD) method.

The SSD method performs a direct mapping between the H.264 partitioning structure and the split decision. The novel MSD determines if the CU must be split based on two lower bounds of motion cost, one for the non-split case and the other for the split case. The lower bounds are computed by reusing information created by the motion propagation algorithm during the CTU initialization.

The SSD method creates a direct mapping between the H.264 partitioning structure and the split decision for the current CU based on the conjecture that HEVC partitioning is rarely finer than H.264 partitioning. Since the macroblock (MB) size is equal to 16×16 samples, a CU having a size of 64×64 or 32×32 samples is automatically split by this method. When the CU size is 16×16, MB partitioning structure is analyzed by an "H.264-DEPTH function" which returns:

1 when the size of the smallest partition is equal to or less than 8×8 samples; or 0 when the size of the smallest partition is equal to 16×16, 16×8 or 8×16.

Hence, a 16×16 CU is not split when the H.264-DEPTH function returns 0, because the CU can reproduce the H.264 partitioning structure or a coarser one.

The SSD method achieves a high-coding efficiency, but tends to overestimate the depth level in HEVC, since CUs of 64×64 and 32×32 samples are always split. The disclosed MSD method addresses this drawback. Since the motion predictors are partially unknown at this stage, this method computes two lower bounds for motion cost: one for the non-split option; denoted JENonSplit, and the other for the split option, denoted JESplit. These lower bounds approximate the real motion costs. The difference between JENonSplit and JESplit is highly correlated to the difference between JNonSplit and JSplit; the real costs. Experimental results show that the difference ($J_{NonSplit}-J_{Split}$) is generally lower than the difference ($JE_{NonSplit}-JE_{Split}$).

The lower bounds of motion cost are computed by a recursive function. The input parameters of the recursive function are: the CU Ci,j, the lower and upper permissible depths, denoted l and u respectively, and the current depth level c. The recursive function computes the lower bound of Ci,j for the non-split case (lower bound for the current depth level i) and the lower bound for the split case (low bound for depth levels from (i+1) to u). The depth level u corresponds to a CU of 8×8 pixels, which is the smallest CU size allowed by the HEVC standard.

The recursive function determines the lower bound for each PU in the current CU and selects the lowest one, denoted $J_{min}$, then recursively determines the lower bounds for sub-CUs and updates the $J_{min}$ if needed. The lower bound calculation is performed by reusing the prediction errors pre-computed by the motion propagation algorithm during the CTU initialization. Since the neighboring CUs are partially or totally unknown, the lower bound calculation takes into consideration that the motion predictors are unknown and the motion cost is then not considered. However, a penalty cost is added based on the partitioning structure.

The penalty cost is based on an estimate of the minimal number of bits required to encode the prediction information. The lower bound for the sub-CUs is computed by summing the lower bounds of the 4 sub-CUs and adding a penalty.

The early termination criterion is only applied when the compared modes have the same size. In the pre-order traversal, application of this criterion is limited since it is impossible to compare a CU with a sub-CU. However, the proposed post-order traversal allows application of this criterion on the combination of 4 sub-CUs (the JPM obtained by the recursive process) and the current PU candidate.

The process of mode evaluation is also early terminated when an inter PU comprises two partitions having the same MV. This condition assumes that a coarser PU, with only one partition, encodes the same MV at a lower cost during the mode decision process.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

For instance, although H.264 and HEVC are used as examples for the input and output formats, the method may apply to other standards as well. One skilled in the art of video compression will be able to determine for which standards the method can be applied. Furthermore, although CTU and macroblocks have been used to illustrate the structure of groups of pixels in HEVC and H.264 standards, similar structures are expected to occur in other standards and the mapping of the methods presented in this document can be mapped to other standards as well.

The invention claimed is:

1. A method for transcoding a succession of type-1 images compressed according to a first compression mode to type-2 images compressed according to a second compression mode, comprising:
   employing a hardware processor for executing software instructions for:
      extracting descriptors of a current type-1 image of said succession of type-1 images;
      generating a reconstructed bitstream of said current type-1 image;
      for each predefined image region:
         extracting motion-vector candidates at fractional-pel precision for a current type-2 image from:
            said current type-1 image;
            a reference type-2 image corresponding to a prior type 1 image; and
            a synthesized part of said current type-2 image;
         creating a cache of prediction errors at said fractional-pel precision with reference to said reconstructed bitstream for each said motion-vector candidate for each predefined cell of said each predefined image region;
         for each predefined segment of said each predefined image region and for each said motion-vector candidate:
            determining a respective prediction error as a function of prediction errors of constituent cells determined from said cache; and
            selecting a preferred motion-vector candidate of least prediction error; and
         formulating a compressed type-2 image using said preferred motion-vector candidate of said each predefined segment.

2. The method of claim 1 further comprising defining an area of size $(M+2\times j\times\Delta)\times(M+2\times j\times\Delta)$ pixels within said current type-1 image for said extracting of said motion-vector candidates, where said each predefined image region is of size M×M pixels, M≥16, $\Delta=4$ and j is a positive integer not exceeding a predefined upper bound.

3. The method of claim 1 wherein:
   each said type-2 image is logically partitioned into contiguous image regions; and
   said synthesized part of said current type-2 image comprises image regions which have already been fully synthesized and which satisfy a predefined proximity to said each predefined image region.

4. The method of claim 3 wherein said predefined proximity is a chessboard distance of 1.

5. The method of claim 1 wherein:
   said each predefined cell comprises 4×4 pixels;
   said function is a sum of prediction errors of said constituent cells; and
   said predefined image region is of size M×M pixels, M being an integer multiple of 4, and
   said cache of prediction errors comprises an (M/4)×(M/4) matrix of records for said each motion-vector candidate, each record corresponding to a cell of said predefined image region and holding a prediction error based on deviation of synthesized cell data from a corresponding content of said reconstructed bitstream.

6. The method of claim 1 further comprising:
   formulating an uncompressed type-2 image based on said preferred motion-vector candidate; and
   determining a revised residual-data component associated with said preferred motion-vector candidate with reference to said uncompressed type-2 image.

7. The method of claim 1 wherein said type-1 compression mode complies with the H.264 standard and said type-2 compression mode complies with the HEVC standard.

8. The method of claim 1 wherein said predefined image region is a block of pixels defined according to said second compression mode.

9. An apparatus for transcoding a succession of type-1 images compressed according to a first compression mode to type-2 images compressed according to a second compression mode, comprising:
   a hardware processor coupled to a memory device storing software instructions organized into:

an augmented type-1 decoder devised to generate descriptors and a reconstructed bitstream of a received current type-1 image of said succession of type-1 images;

a transcoding module configured to:
   extract, for each predefined image region, motion-vector candidates at fractional-pel precision for a current type-2 image based on said descriptors;
   create a cache of prediction errors at said fractional-pel precision with reference to said reconstructed bitstream for each motion-vector candidate for each predefined cell of said each predefined image region;
   for each predefined segment of said each predefined image region and for each said motion-vector candidate determine:
      a respective prediction error as a function of prediction errors of constituent cells determined from said cache; and
      select a preferred motion-vector candidate of least prediction error; and
   an augmented type-2 encoder configured to use said preferred motion-vector candidate of said each predefined segment in formulating a compressed type-2 image.

10. The apparatus of claim 9 wherein sources of said motion-vector candidates comprise at least one of:
   said current type-1 image;
   a reference type-2 image corresponding to a prior type-1 compressed image; and
   a synthesized part of said current type-2 image.

11. The apparatus of claim 10 wherein said transcoding module is configured to extract a subset of said motion-vector candidates from an area of size $(M+2\times j\times\Delta)\times(M+2\times j\times\Delta)$ pixels within said current type-1 image, where said each predefined image region is of size M×M pixels, M≥16, Δ=4 and j is a user-defined positive integer not exceeding a predefined upper bound.

12. The apparatus of claim 10 wherein said transcoding module is further configured to extract a subset of said motion-vector candidates from selected predefined image regions of said current type-2 image, each said selected predefined image region having a specified proximity to said each predefine image region, said each type-2 image being logically partitioned into contiguous image regions.

13. The apparatus of claim 12 wherein said specified proximity is a user defined chessboard distance.

14. The apparatus of claim 10 wherein:
   said each predefined cell comprising 4×4 pixels;
   said function is a sum of prediction errors of said constituent cells; and
   said predefined image region is of size M×M pixels, M being an integer multiple of 4, and said cache of prediction errors comprises an (M/4)×(M/4) matrix of records for each motion-vector candidate, each record corresponding to a cell of said predefined image region and holding a prediction error based on deviation of synthesized cell data from a corresponding content of said reconstructed bitstream.

15. The apparatus of claim 9 wherein said augmented type-2 encoder is further devised to:
   formulate an uncompressed type-2 image based on said preferred motion-vector candidate; and
   determine a revised residual-data component associated with said preferred motion-vector candidate with respect to said uncompressed type-2 image.

16. The apparatus of claim 9 wherein said type-1 compression mode complies with the H.264 standard and said type-2 compression mode complies with the HEVC standard.

17. The apparatus of claim 9 wherein said predefined segment is determined according to a selected partitioning structure of said each predefined image region.

18. The method of claim 1 wherein said predefined segment is determined according to a selected partitioning structure of said each predefined image region.

19. The method of claim 7 wherein said each predefined image region is a Coding Tree UNIT of the HEVC standard.

20. The apparatus of claim 16 wherein said each predefined image region is a Coding Tree UNIT of the HEVC standard.

* * * * *